United States Patent
Fujita et al.

[11] Patent Number: 6,020,976
[45] Date of Patent: Feb. 1, 2000

[54] SHUTTLE TYPE RECORDING APPARATUS

[75] Inventors: Miyuki Fujita, Tokyo, Japan; Shinji Kamemitsu, Irvine, Calif.; Hiromitsu Hirabayashi, Irvine, Calif.; Makoto Takemura, Irvine, Calif.; Yuji Akiyama, Yokohama, Japan; Akitoshi Yamada, Irvine, Calif.

[73] Assignee: Canon Kabushiki Kaisha, Tokyo, Japan

[21] Appl. No.: 08/901,835

[22] Filed: Jul. 28, 1997

[30] Foreign Application Priority Data

Jul. 30, 1996 [JP] Japan ................................. 8-200852

[51] Int. Cl.[7] ........................................ G06F 15/00
[52] U.S. Cl. ................................ 358/1.3; 358/401; 347/3
[58] Field of Search .................................... 345/109, 106, 345/111, 114, 103; 358/518, 526, 532, 503, 1.3; 347/1, 2, 3, 19, 48, 117

[56] References Cited

U.S. PATENT DOCUMENTS

| | | | |
|---|---|---|---|
| 4,272,771 | 6/1981 | Furukawa | 346/75 |
| 5,521,623 | 5/1996 | Dochovna | 347/74 |
| 5,528,270 | 6/1996 | Tajika | 347/19 |
| 5,696,890 | 12/1997 | Geissler | 395/109 |

FOREIGN PATENT DOCUMENTS 50-81437  7/1975  Japan ............................. G06K 15/00

*Primary Examiner*—Jerome Grant, II
*Attorney, Agent, or Firm*—Fitzpatrick, Cella, Harper & Scinto

[57] ABSTRACT

In a recording apparatus for recording on a recording medium by using a plurality of recording heads arrange at a predetermined interval in a scan direction, said recording heads are caused to scan corresponding divided recording areas, said recording heads are caused to make the record by sharing the corresponding divided recording areas when said recording heads are caused to scan the divided recording areas, and record signals to be inputted to the recording heads corresponding to the divided recording areas to be recorded in the shared manner, are independently corrected for each of the divided recording areas. As a result, the occurrence of the density difference between divided areas is prevented.

17 Claims, 26 Drawing Sheets

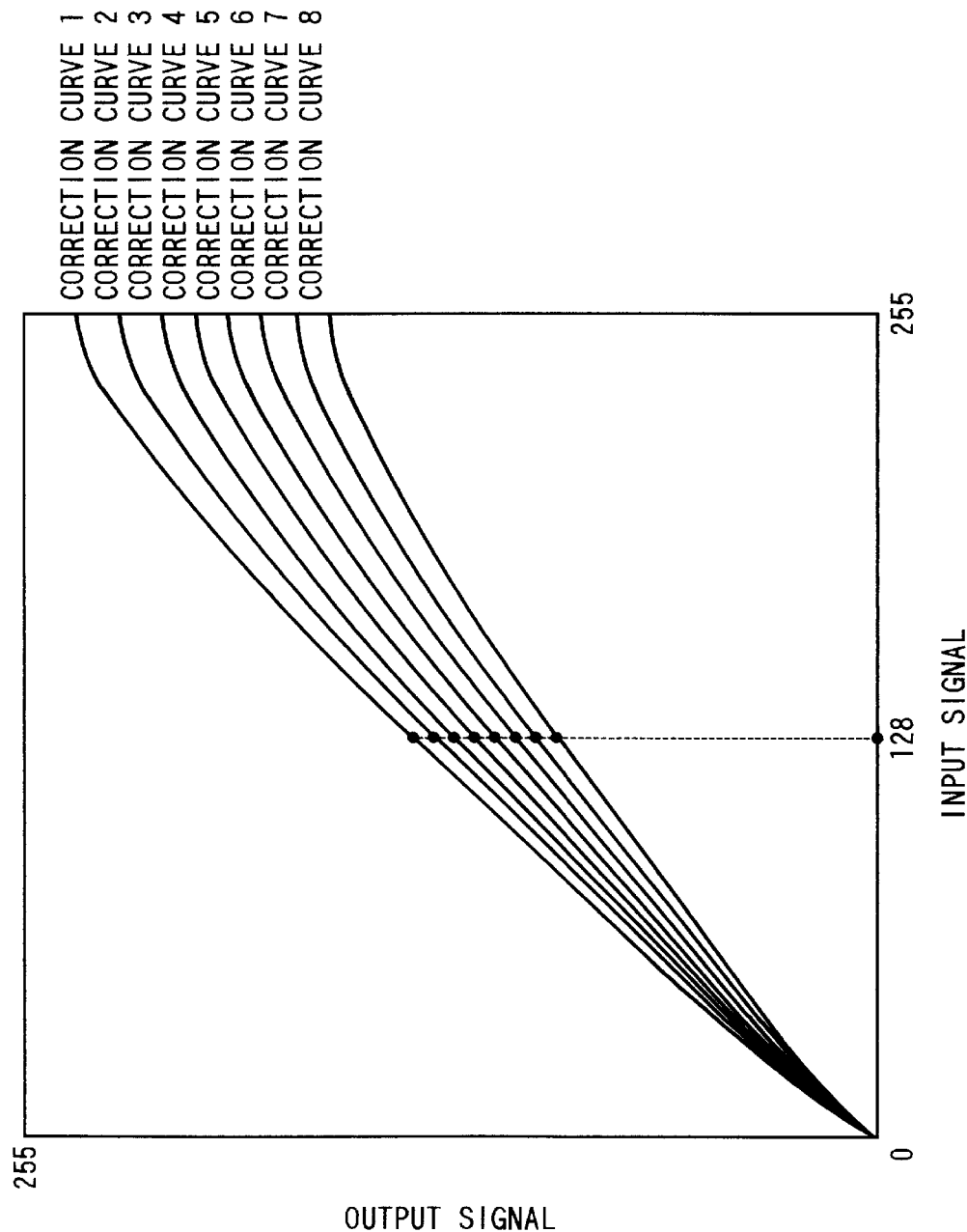

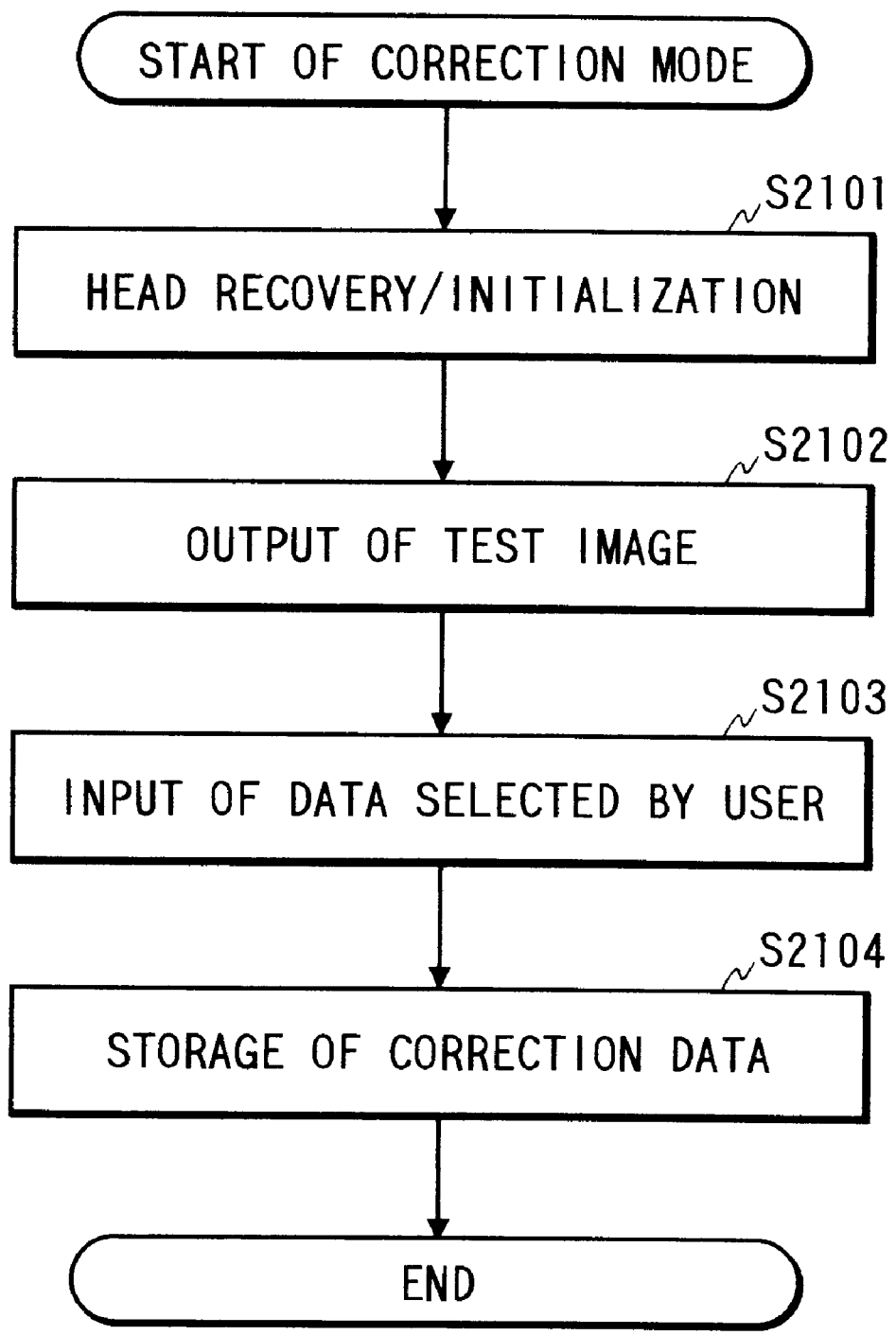

SHUTTLE TYPE RECORDING APPARATUS

BACKGROUND OF THE INVENTION

1. Field of the Invention

The present invention relates to a serial type recording apparatus for recording characters and images on a recording medium while scanning a recording head against the recording medium. More particularly, the present invention relates to a shuttle type recording apparatus in which a plurality of recording heads arranged at a predetermined interval can record divided recording areas for the respective recording heads.

The present invention is particularly suitable for a recording apparatus for recording by applying coloring agent on the recording medium in accordance with image data, and it is more particularly suitable for an ink jet type recording apparatus in which liquid recording ink is discharged as the coloring agent to make a record.

The present invention is applicable to any equipment which uses the recording medium such as paper, cloth, skin, unwoven cloth or OHP sheet and further metal or the like. Specific application equipments include office products such as a printer, a copying machine and a facsimile machine and industrial manufacturing machines.

2. Related Background Art

The serial type recording apparatus in which recording is made while scanning the recording head, has been commonly used in various recording apparatus because it is less expensive than a recording apparatus in which recording is made by using a full line head which covers an entire width of the recording medium such as recording sheet or the like.

In the serial type recording apparatus, a material which reacts to a heat generation element of a thermal head to a dedicated thermal sheet and a material which cause a dedicated photo-sensitive sheet to optically generates a recording color have been known as the material to generate color of the coloring agent to the recording material. As a system to make a record by applying the coloring agent to the recording material by the recording head, various systems have been put into practice and proposed. For example, an impact recording system in which an ink ribbon having liquid ink impregnated as the coloring agent is pressed and abutted against the recording medium by a print wire to transfer the ink, a thermal fusion transfer recording system or a thermal sublimation system in which a heat generating element of a thermal head is reacted to an ink ribbon head having a solid coloring agent applied to transfer the ink and an ink jet system in which liquid recording ink is discharged to make a record.

Recently, from a stand point of plain sheet recording, the latter recording system for applying the coloring agent is main stream. Among them, the ink jet recording system has advantages of low noise, low running cost, easiness to make the apparatus compact, ability of plain sheet recording and easiness for color recording, and has been commonly used in the recording apparatus such as a printer and a copying machine.

In the serial type recording apparatus, recording heads each of which allows the recording only in a relatively small limited area of the recording element such as a discharge port provided in the recording head are arranged on a carriage and they are sequentially scanned to make a record. Thus, it is relatively difficult to increase a recording speed and the increase of the recording speed has been a problem for the serial type.

On the other hand, in order to increase the speed of the image recording, it has been proposed and put into practice to increase a recording width (arrangement range of recording elements) of the recording head, to increase the carriage speed and a recording frequency to reduce a scan time or to scan bilaterally to make a record. However, each system has limitation. For example, in order to increase the recording width, corresponding improvement of precision in manufacturing the head is required and the recording head becomes expensive and a capacity of print buffer for temporarily storing the record data increases so that a problem is raised in terms of cost. In the system in which the color is generated by utilizing heat or the coloring agent is applied, means for preventing the deterioration of the recording quality or the break of the head due to self-temperature-rise of the recording head is needed particularly when the recording width is large. In the ink jet recording system in which the liquid recording ink which is not in contact with the recording medium, when a recording head of a large recording width, means to prevent the deterioration of the recording quality due to cockling of the recording medium by absorption of moisture of the ink is complex. When the recording frequency is raised, it is necessary to increase the scan speed of the carriage to maintain a certain pixel density, but in this case, a load of a drive source increases and the recording quality may be deteriorated by vibration of the ink in the recording head due to the high speed of the carriage.

A system which is relatively effective to increase the speed of the serial type image recording apparatus is disclosed in JP-A-50-81437 and U.S. Pat. No. 4,272,771. This reference discloses that, in order to concurrently print on a left half and a right half of a print line, a left print head assembly and a right print head assembly supported by one carriage mechanism are used to attain the speed-up of approximately two times. It also teaches that a higher recording speed may be attained by increasing the number of print head assemblies to more than two or conducting the bilateral printing.

However, in the construction for recording on one sheet by a plurality of recording heads as is the case of the prior art, a density difference may appear between recording areas recorded by the respective heads because of a difference in characteristics of the heads or a difference in characteristics of recording materials such as inks and ink ribbons.

FIGS. 1A and 1B show a phenomenon thereof. Here, two heads, head A and head B are used in which the head B has an output characteristic of a higher density than the head A. FIG. 1A shows record results for three stages of print duty, 25%, 50% and 100% when the recording areas of the head A and the head B is perfectly divided into two parts at the center of the sheet. As seen from FIG. 1A, the density difference can be clearly observed at the boundary for every duty.

On the other hand, FIG. 1B shows similar print results when certain overlapping area is provided in the recording areas of the head A and the head B. For the overlapping recording area, substantially half of the data of each of the two heads is thinned and the image is complementarily completed by overlapping the records by the both heads. Accordingly, the overall density of the overlapping recording area is higher than that of the recording area by only the head A, and lower than that of the recording area by only the head B. In this case, the density difference on the both sides of the overlapping area is clear although it does not appear as clearly as it is in FIG. 1A. In this manner, the problem of the density difference due to the difference of the output characteristics between the heads has not been completely solved when a plurality of recording heads are used and the recording is made by dividing the recording area. Accordingly, the above prior art recording apparatus cannot provide a complete image.

SUMMARY OF THE INVENTION

It is an object of the present invention to provide a recording head which produces uniform and smooth image without casing the density difference due to the difference of the output characteristics of the recording heads on the entire area of the sheet.

In order to achieve the above object, in accordance with a first aspect of the present invention, there is provided a recording apparatus for recording on a recording medium by using a plurality of recording heads arranged at a predetermined interval in a scan direction, comprising scan means for causing the recording heads to scan corresponding divided recording areas, control means for causing the recording heads to make the record by sharing the corresponding divided recording areas when the scan means causes the recording heads to scan the divided recording areas and correction means capable of independently correcting record signals to be inputted to the recording heads corresponding to the divided recording areas to be recorded in the shared manner, for each of the divided recording areas.

In accordance with another aspect of the present invention, there is provided an image recording system having a host computer, display means for displaying a process content of the host computer and a recording apparatus for recording on a recording medium by using a plurality of recording heads arranged at a predetermined interval in a scan direction, the recording apparatus comprising scan means for causing the recording heads to scan corresponding divided recording areas, record control means for causing the recording heads to make the record by sharing the corresponding divided recording areas when the scan means causes the recording heads to scan the divided recording areas, and correction means capable of independently correcting record signals to be inputted to the recording heads corresponding to the divided recording areas to be recorded in the shared manner, for each of the divided recording areas, the correction means including a plurality of correction tables for correcting the record signals and using the correction tables for the respective divided recording areas, the record control means outputting a test pattern comprising an output pattern of one of the recording heads and output patterns of other recording heads holding the output pattern therebetween, the display means displaying the test pattern for each of the correction tables.

In accordance with still another aspect of the present invention, there is provided a recording method for recording on a recording medium by using a plurality of recording heads arranged at a predetermined interval in a scan direction, comprising the steps of causing the recording heads to scan corresponding divided recording areas, causing the recording heads to make the record by sharing the corresponding recording areas when the scan steps causes the recording heads to scan the corresponding recording areas, and independently correcting for each of the divided recording areas record signals inputted to the recording heads for the divided recording areas to be recorded in the shared manner.

In accordance with a further aspect of the present invention, there is provided a method for transferring a record signal to a recording apparatus for recording on a recording medium by using a plurality of recording heads arranged at a predetermined interval in a scan direction, the recording apparatus comprising scan means for causing the recording heads to scan corresponding divided recording areas, control means for causing the recording heads to make the record by sharing the corresponding divided recording areas when the scan means causes the recording heads to scan the divided recording areas, the method comprising the steps of independently correcting the record signal inputted to the recording heads corresponding to the divided recording areas to be recorded in the shared manner, and transferring the record signal corrected in the correction step to the recording head.

By this arrangement, since the input signal value of the recording head can be adjusted independently at each of a plurality of recording areas, the input signal value may be corrected in accordance with the use of the recording head in each recording area so that the occurrence of the density difference between respective areas can be presented.

BRIEF DESCRIPTION OF THE DRAWINGS

FIG. 14 shows a plurality of correction curves used in the first embodiment of the present invention;

FIG. 15 shows a flow chart of a process of a correction mode in the first embodiment of the present invention;

DESCRIPTION OF THE PREFERRED EMBODIMENTS

The embodiments of the present invention are now explained with reference to the drawings.

[First Embodiment]

Figure 2:
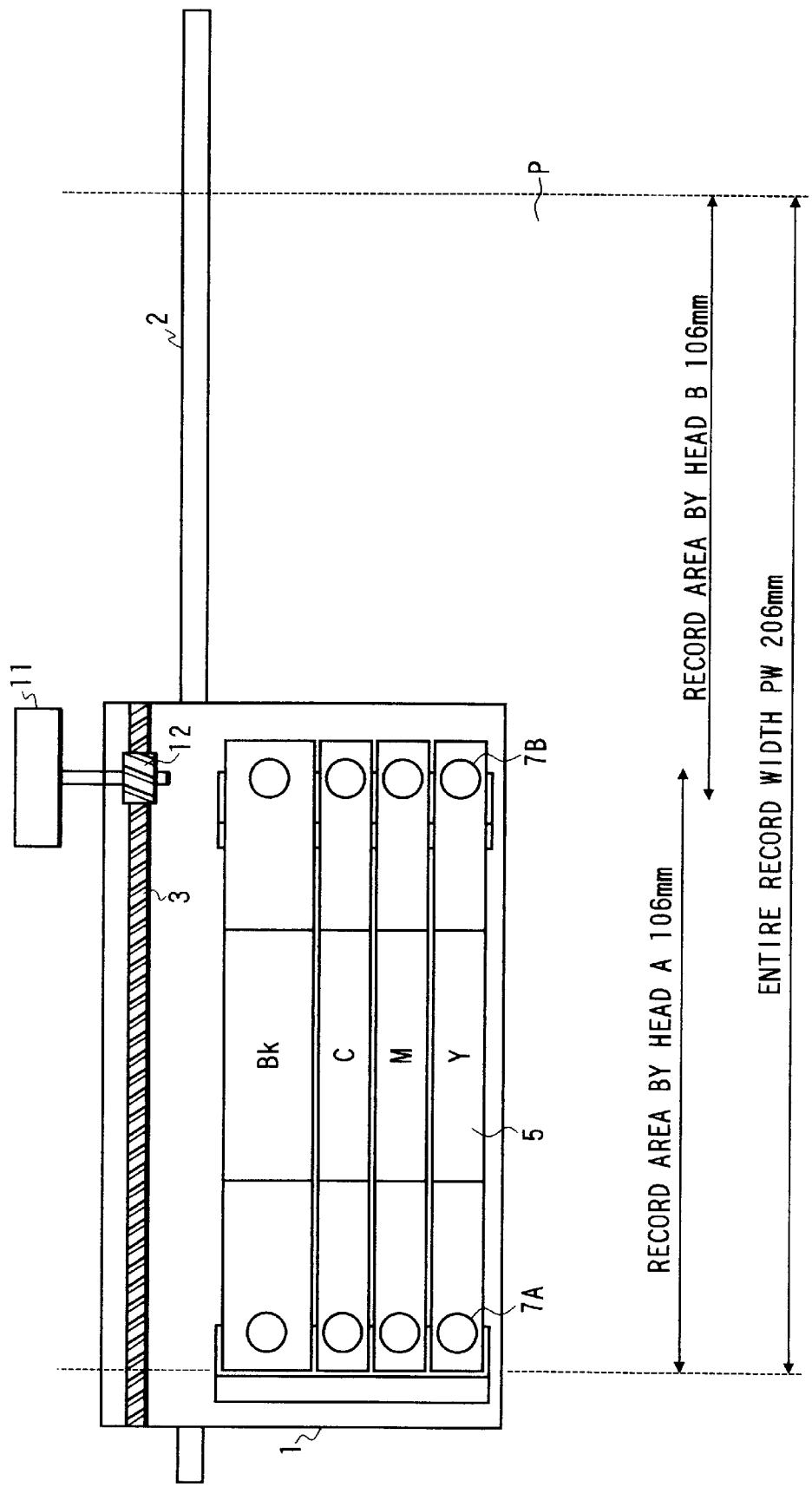
FIG. 2 shows a top view of a recording head applicable to the present invention.
Figure 3:
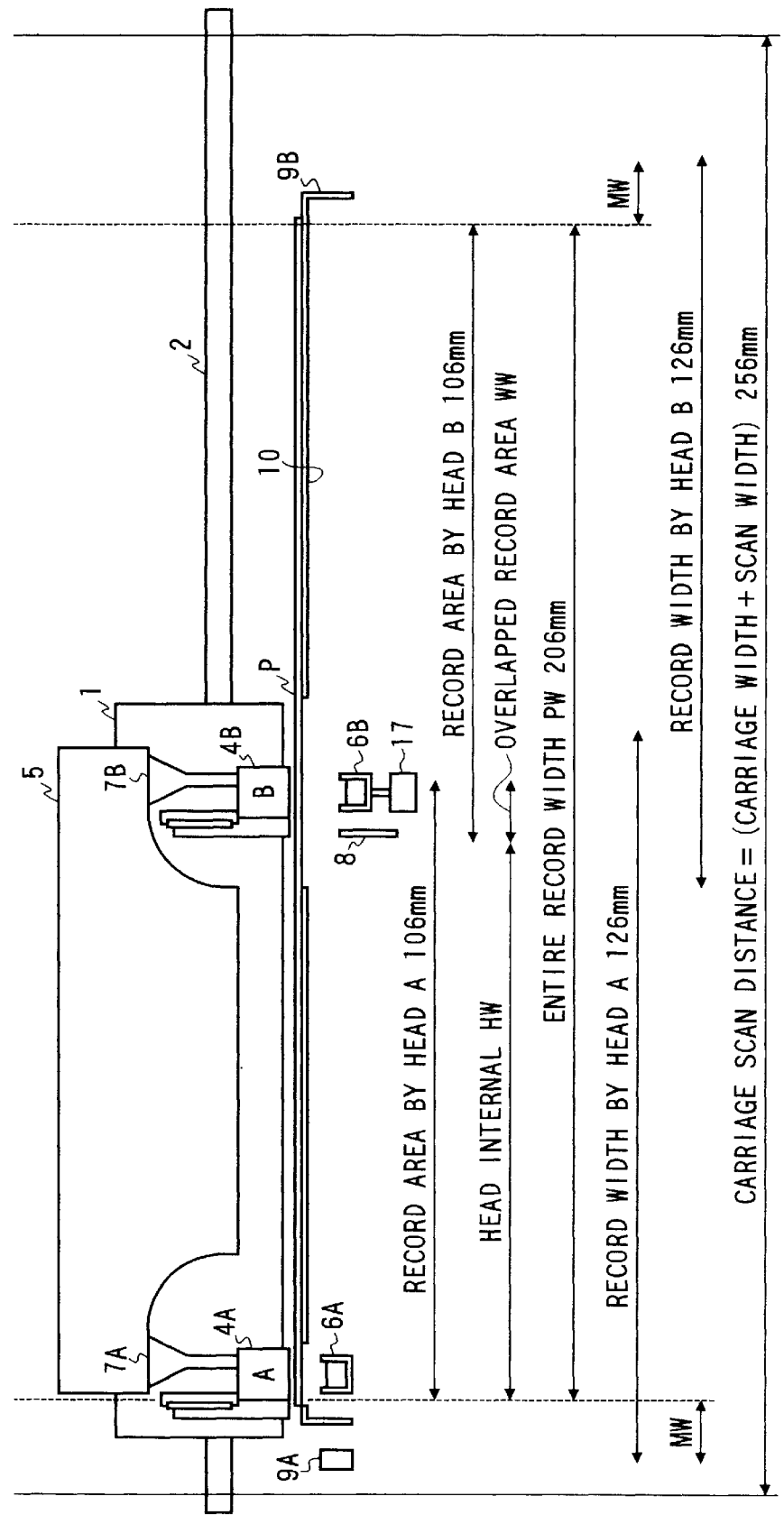
FIG. 3 shows a sectional view of a recording unit of the above apparatus.

FIGS. 2 and 3 show a top view and a schematic sectional view of the recording unit in an ink jet recording apparatus to which the present invention may be applied.

A recording medium P inserted to a sheet feed position of the recording apparatus is fed to a recordable area of a recording head unit by a feed roller. A platen 10 is provided under the recording medium in the recordable area. A carriage 1 is engaged with a guide shaft 2 and a rail 3, and bilaterally movable along these two members. As a result, each of heads 4A and 4B on the carriage can reciprocally scan the divided recording areas assigned thereto. The recording heads 4A and 4B for discharging inks are mounted on both sides of the carriage 1 and ink tank 5 for supplying the inks to the respective recording heads 4A and 4B is mounted at a center of the carriage 1. Thus, each of the recording heads 4A and 4B makes a record by discharging the inks in accordance with record data while it scans the corresponding area.

A recovery unit such as a cap 6 is provided below the platen 10 on a left side and at a center of the area through which the carriage 1 may be moved, and it is used to cap the discharge ports of the recording heads 4A and 4B during non-record mode. Numerals 7A and 7B denote ink supply ports for introducing the inks into the recording heads 4A and 4B.

The construction of the present embodiment offers a great effect even in monochromatic recording such as black and white. When color recording is made by using a plurality of colors of inks, the effect may be more clearly observed in view of ink accommodation volume of the ink tank. Accordingly, the present embodiment uses four colors of inks, black (Bk), cyan (C), magenta (M) and yellow (Y) and the respective color inks are independently replaceable. Namely, recording heads 4A and 4B having a discharge port group for each of colors (Bk, C, M and Y) are mounted on the both sides of the carriage 1, and a Bk tank, a C tank, an M tank and a Y tank for supplying inks to the both heads in common are mounted at a center. In the present embodiment, inks are supplied from one ink tank to the two recording heads although the application of the present invention is not limited thereto. For example, one ink head may be mounted for each head and the respective heads may be integrated. The tanks may be removable from the heads.

The 64 Bk discharge ports and the 24 discharge ports for each of colors C, M and Y are integrally formed in the respective recording heads 4A and 4B at a density of 360 dpi, respectively, and the respective color discharge port groups are separated by eight discharge port pitches. The two recording heads are aligned to each other and mounted on the carriage.

The ink jet recording head of the present embodiment adopts a discharge system in which a heat generating element which is an electro-thermal transducer is arranged for each ink discharge port, and a drive signal representing the record information is applied to the heat generating element to discharge the ink from the corresponding discharge port.

Figure 4:
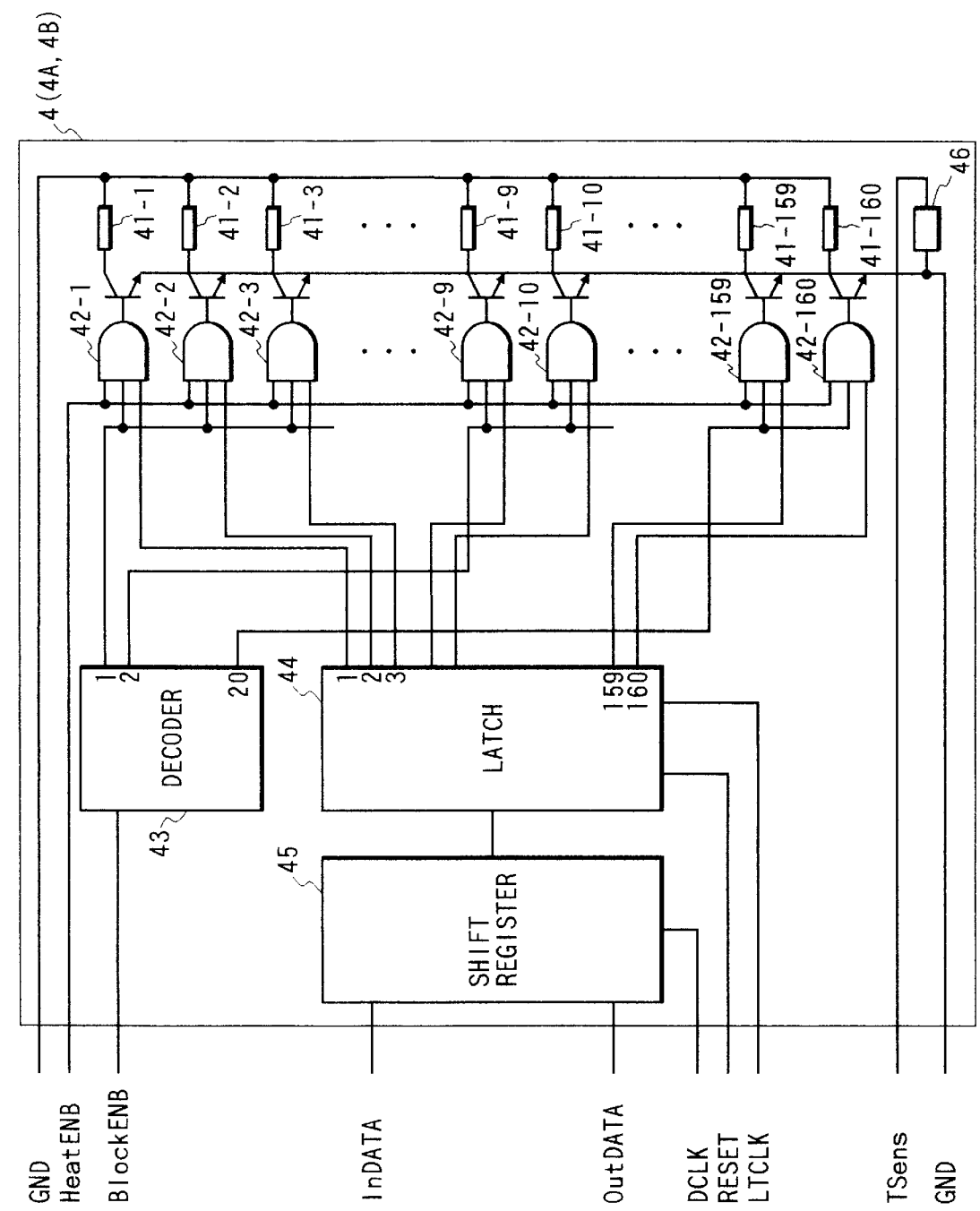
FIG. 4 shows a block diagram of a configuration for driving recording heads used in the above apparatus.

FIG. 4 shows a block diagram of a configuration of heat generating element drive of the recording head.

The heat generating elements 41-1 to 41-160 can generate heads independently. Since a large current must be supplied if all of those heat generating elements are concurrently driven, a load of a power supply increases. Further, since energy supplied to the individual heat generating elements is reduced by a voltage drop by a wiring resistance, normally recording may not be made. Thus, a problem in terms of image quality is a concern. Thus, in the present embodiment, known time division drive is conducted in which eight discharge ports including the color separation of eight discharge port pitch are formed into one block and the discharge ports are divided into 20 blocks, and a drive timing for each block is adjusted by a signal from a decoder 43 for making a record. In order to prevent the linearity of the record from being damaged by the time division drive, the recording head is inclined by an amount corresponding to the scan speed of the recording head.

The ink in the ink flow path rapidly heated by the heat of the heat generating element 41 forms air bubbles by film boiling. By the pressure of the air bubble formation, ink droplets are discharged toward the recording medium P and characters and images are formed on the receding medium. The volume of the ink droplets of each color discharged is approximately 40 ng. The ink liquid path connected to the discharge port is provided for each discharge port. A common liquid chamber for supplying inks to those liquid paths is provided for each color behind a position at which the ink liquid path is arranged.

Ink is supplied to an ink tank 5 of each color from the common liquid chamber through the ink supply path. The heat generating element 41 which is the electro-thermal transducer for generating thermal energy utilized to discharge the ink droplets and an electrode wiring for supplying power thereto are arranged in the ink liquid path corresponding to each discharge port. The heat generating elements 41 and the electrode wirings are formed on a substrate made of silicon by a film forming technique. A protection film is formed on the heat generating element 41 to prevent direct contact of the ink and the heat generating element 41. Further, by laminating a diaphragm made of resin or a glass material on the substrate, the discharge ports, the ink liquid paths and the common liquid chamber are formed. The recording system which utilizes the heat generating elements 41 which are electro-thermal transducers is usually called a bubble jet recording system because it utilizes air bubbles generated by the application of the thermal energy when the ink droplets are to be discharged.

AND gates 42-1 to 42-160 ANDS a select signal for the time division outputted from a decoder 43, the image data outputted from a latch circuit 44 and a heat enable signal for defining a drive time to output a drive signal to the heat generating element 41. A shift register 45 converts the serially inputted image data to parallel data and outputs it to the latch circuit 44.

Referring again to FIG. 3, two caps 6A and 6B are provided on a left side and at a center of the apparatus at an interval corresponding to the recording heads as one of maintenance units of the recording heads. Each of the caps 6A and 6B are vertically movable. When a recording medium P is not present at the recording unit and the recording heads are located at the cap positions in the non-record mode, the cap 6A and 6B join to the recording heads 4A and 4B to cap them to prevent the increase of the viscosity due to the evaporation of the ink in the discharge ports of the recording heads 4A and 4B and the failure of discharge due to the solidification. The cap 6B at the center is linked to a pump unit 17. The pump unit 17 is used to generate a negative pressure in a recovery process for sucking the ink from the discharge port of the recording head while the cap unit and the recording head are joined. The pump unit 17 may be any of known cylinder pump and the tube pump. Since the cap has a function to prevent the evaporation in addition to the forced recovery of the ink, it is of quasi-atmosphere open structure coupled to atmosphere by a porous structure in order to fully suppress the evaporation of the ink and avoid the pressure change in the cap. The pump unit may be provided in each of the caps 6A and 6B. In the present embodiment, in order to simplify the construction, the pump unit is connected to only the cap at the center. In the recovery process of the left hand recording head, the carriage is moved so that the center cap may be used. The disposed liquid by the suck is sent to a disposed liquid tank, not shown.

As the maintenance unit of the recording heads, a blade 8 for wiping the discharge ports of the recording heads are further provided. The blade 8 is formed by an elastic material such as rubber in order to wipe the ink and the treatment liquid attached to the discharge port forming planes of the respective recording heads 4A and 4C. The blade 8 is used in common by the recording heads 4A and 4B and is vertically movable by an elevator unit, not shown, so that it may assume an up position to wipe the surface of the recording head and a down position at which it does not interfere the surface of the recording head. Two blades 8 may be provided for the two recording heads 4A and 4B. In the present embodiment, in order to simplify the construction, only one blade is provided near the center so that it acts to the two recording heads in common.

As the maintenance unit of the recording heads 4A and 4B, the preliminary discharge receptacles 9A and 9B are further provided on the opposite sides of the receding unit. They are used to discharge inks at a predetermined timing separately from the recording in order to prevent the change of the discharge characteristic and the change of the color tone due to the evaporation of the ink during the recording or the stand-by. Since they may be needed even during the record mode, it is necessary to provide the at areas through which the recording medium P passes.

As a monitor unit for the recording heads 4A and 4B, a temperature sensor 46 is provided in the recording heads 4A and 4B in the present embodiment. Thus, an optimum drive condition of the recording head in compliance to the temperature of the recording heads is determined and the maintenance unit is operated in accordance with the temperature information to stabilize the recording characteristic.

Figure 5:
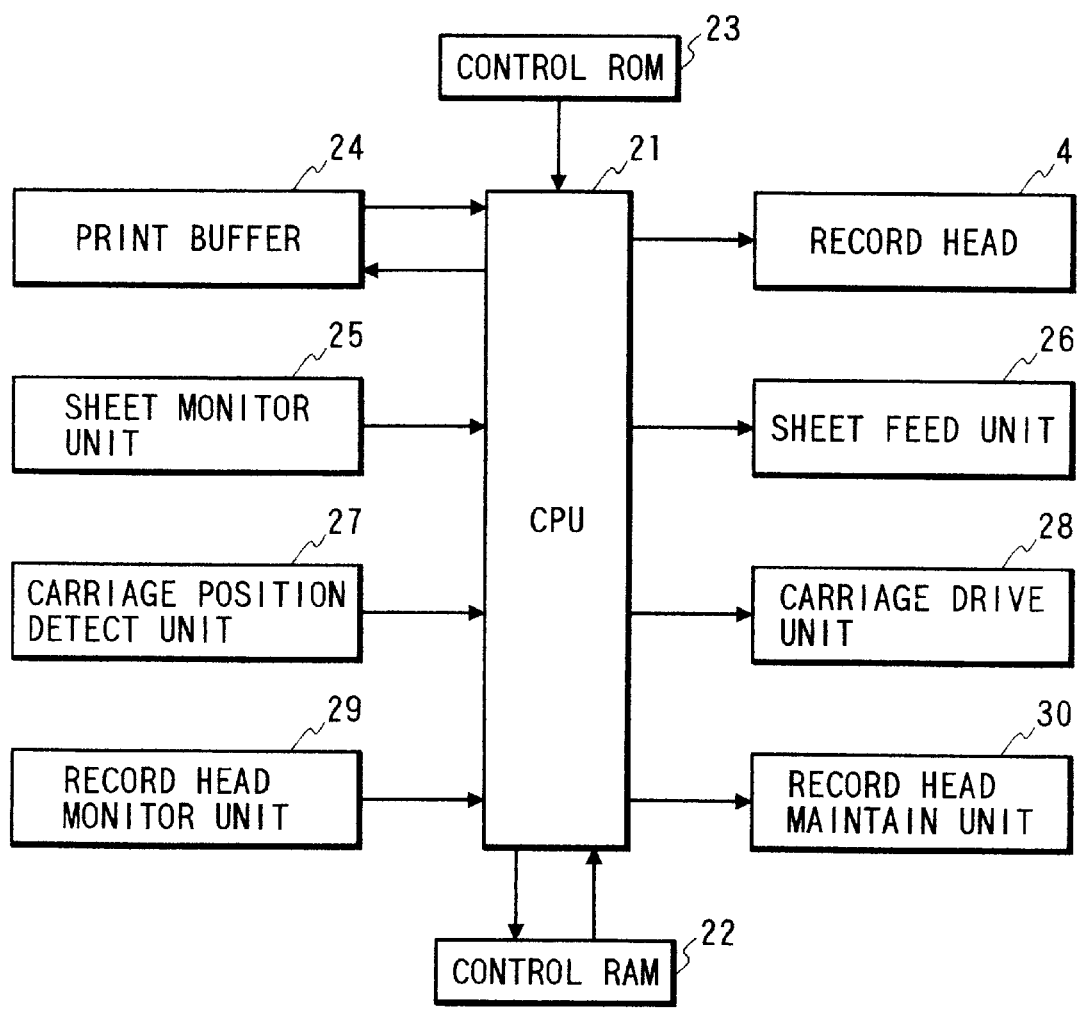
FIG. 5 shows a block diagram of a control unit of the above recording head.

FIG. 5 shows a block diagram of a control unit of the ink jet recording apparatus of the present embodiment. Data of the characters or the images to be recorded (hereinafter referred to as image data) is inputted from a host computer to a reception buffer of the recording apparatus. Data for checking if the data is correctly transferred and data for indicating an operation condition of the recording apparatus are transferred from the recording apparatus to the host computer. The data in the reception buffer is temporarily stored in a print buffer (RAM) 24 while it is controlled under the management of a CPU 21, a control RAM 22 and a control ROM 23, and it is supplied to the recording heads 4A and 4B as the record data. The sheet feed unit 26 controls a drive source such as a motor to drive a sheet feed roller and a line feed roller by a command from the CPU 21 in accordance with the information of a sheet monitor unit 25. A carriage drive unit 28 controls a carriage drive source by a command from the CPU 21 in accordance with the information of a carriage position detecting unit 27. A recording head maintenance unit 30 maintains the recording head 4 and optimizes the drive condition thereof by a command from the CPU 21 in accordance with the information from a recording head monitor unit 29 comprising sensors for detecting the temperature of the recording head and the presence or absence of the ink.

The carriage unit and the drive thereof in the present embodiment are now explained in more detail. As shown in FIG. 2, the carriage 1 is bilaterally movable along two guide shafts 2 (one of which is not shown) and a rail 3 provide in the carriage so that it can reciprocally scan the recording area. The rail 3 is of rack gear structure, the rack gear may be integrally molded with the carriage or separately formed rack gear is integrally attached to the carriage. It engages with a pinion gear coupled to a carriage motor 11 which is a drive source so that it may be driven and scanned in forward direction and backward direction as the carriage motor 11 rotates.

Referring to FIG. 3, the operations and the positional relationship of the carriage 1, the carriage drive unit 28, the recording heads 4A and 4B and the recording head maintenance unit 30 are explained in detail.

FIG. 3 shows the position of the carriage in the left end recording. The left side recording head 4A is positioned at the left end of the entire recording width PW (206 mm) and the right side recording head 4B is arranged at the left end of an overlapping recording width WW (6 mm) which is provided as required. That is, the two heads 4A and 4B are arranged on the carriage 1 with the head interval HW (100 mm) thereof.

Figure 6:
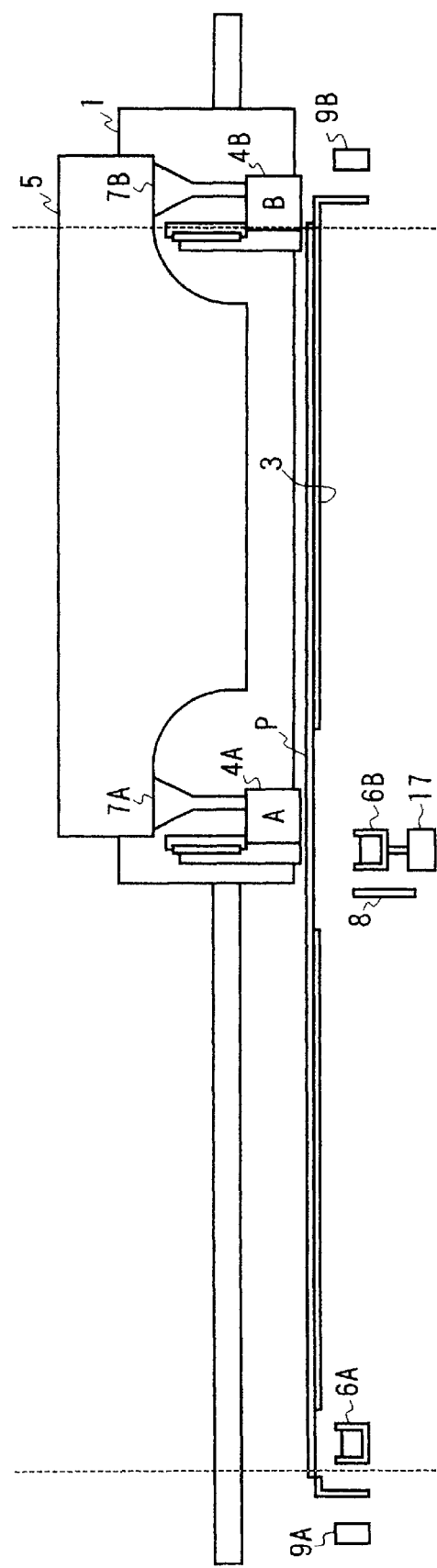
FIG. 6 shows a sectional view of the recording unit in a right end recording mode in the above apparatus.

FIG. 6 shows the carriage 1 in the right end receding as opposed to that shown in FIG. 3. The right side recording head 4B is positioned at the right end of the entire recording width PW (206 mm) and the recording head 4A is positioned on the right side of the overlapping recording width. The carriage 1 has thus been moved rightward by 106 mm from the position shown in FIG. 3. Accordingly, as shown in FIG. 7, the recording head 4A records the area of left 106 mm of the entire recording width and the recording head 4B records the area of right 106 mm of the entire recording width, and the overlapping recording area 6 mm at the center is recorded by appropriate sharing of the two recording heads.

Figure 7:
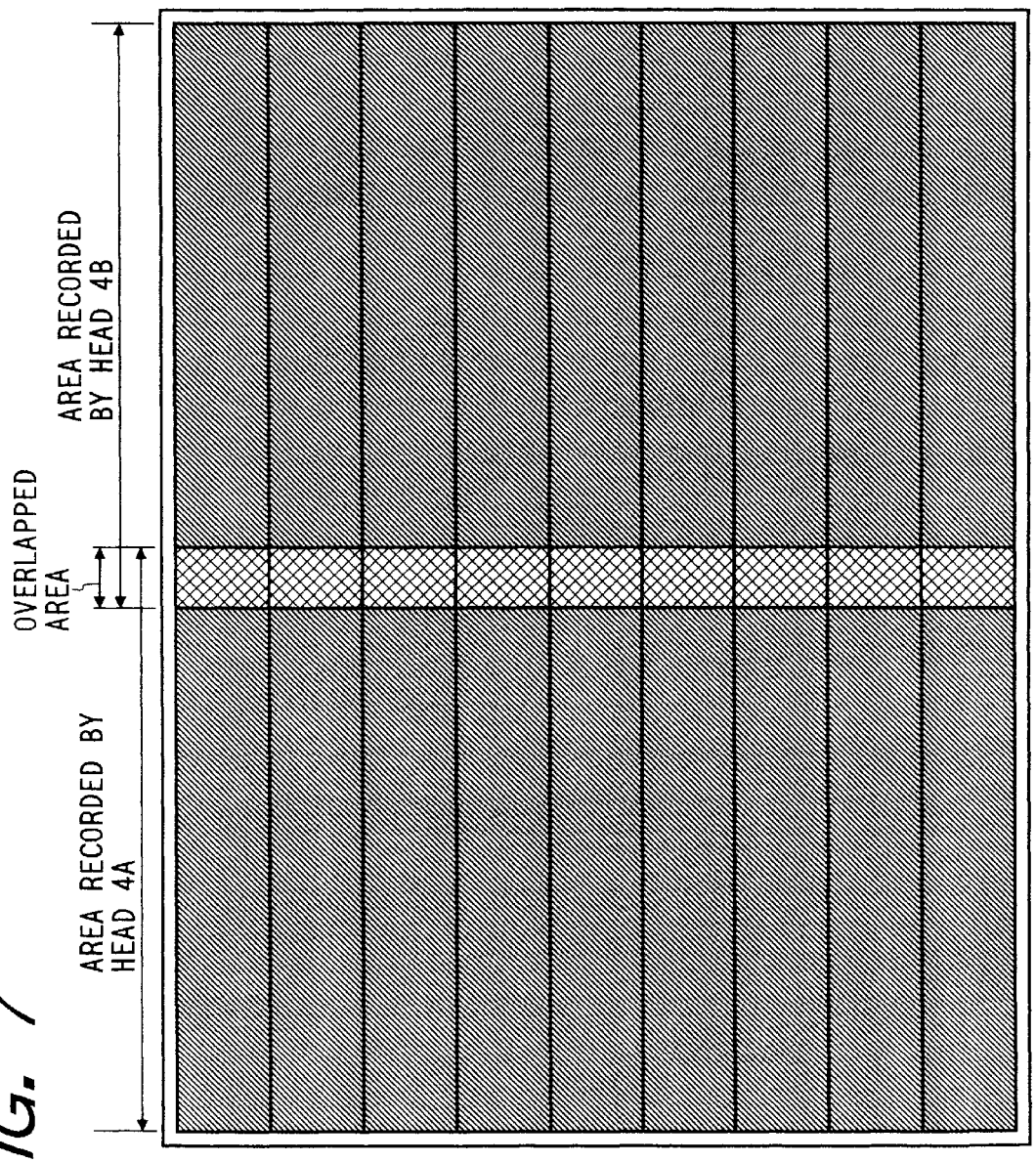
FIG. 7 illustrates the sharing of recording areas in the above apparatus.
Figure 8A:
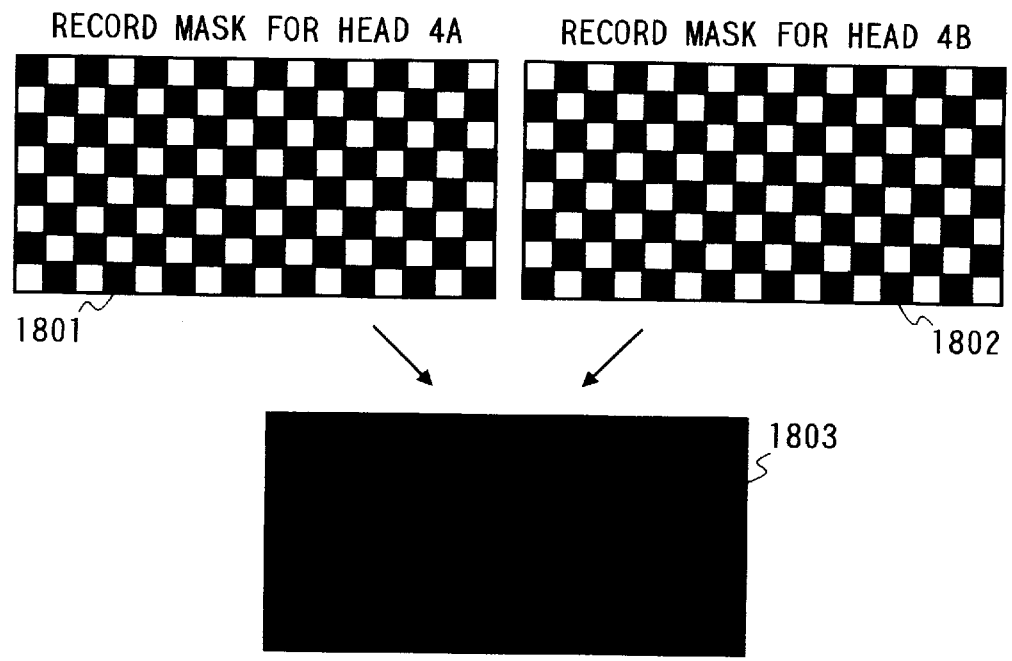
FIGS. 8A and 8B show thinned patterns in overlapping recording area by two recording heads in accordance with one embodiment of the present invention.
Figure 8B:
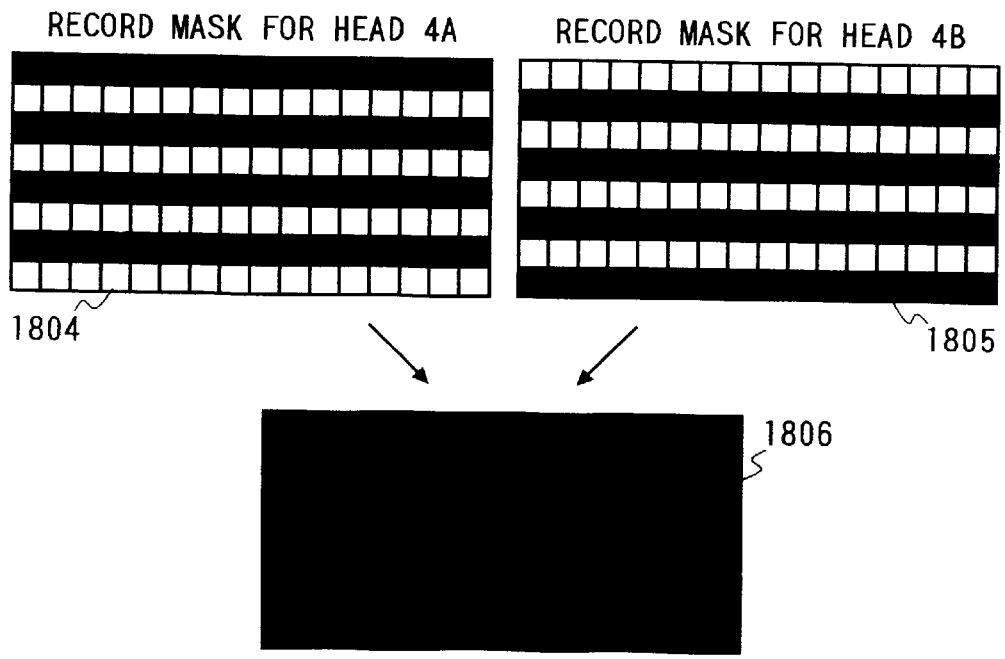
Figure 9:
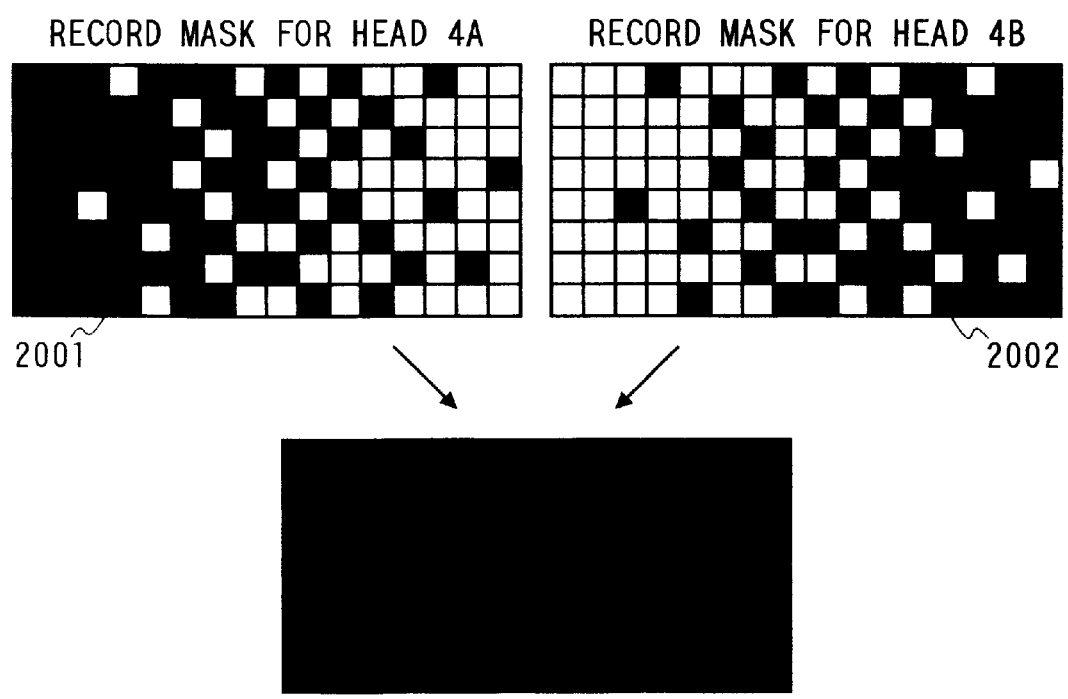
FIG. 9 shows another example of the thinned pattern in the overlapping recording area.

Examples of records of the overlapping area shown in FIG. 7 are shown in FIGS. 8A, 8B and 9. In an example shown in FIG. 8A, a recording mask 1801 for the head 4A and a recording mask 1802 for the head 4B are of complementary checker patterns to complete an image 1803 of the overlapping area. In an example shown in FIG. 8B, a mask 1804 for the head 4A and a mask 1805 for the head 4B are of complementary comb patterns to complete an image 1806 of the overlapping area. Thinned patterns shown in FIGS. 8A and 8B are simple repetitive patterns using 2×2 pixels or 2×1 pixels as a unit so that a memory for a thinning mask for the overlapping recording area may be of relatively small capacity.

On the other hand, a thinning pattern shown in FIG. 9 has gradation in a direction of scan for each of the heads 4A and 4B. In this case, a memory for the thinning pattern which extends to the entire overlapping area is necessary. Since the print duty for each of the heads gradually decreases in the main scan direction by this pattern, the difference in the characteristics of the heads is less recognizable and smooth image can be attained.

Figure 10A:
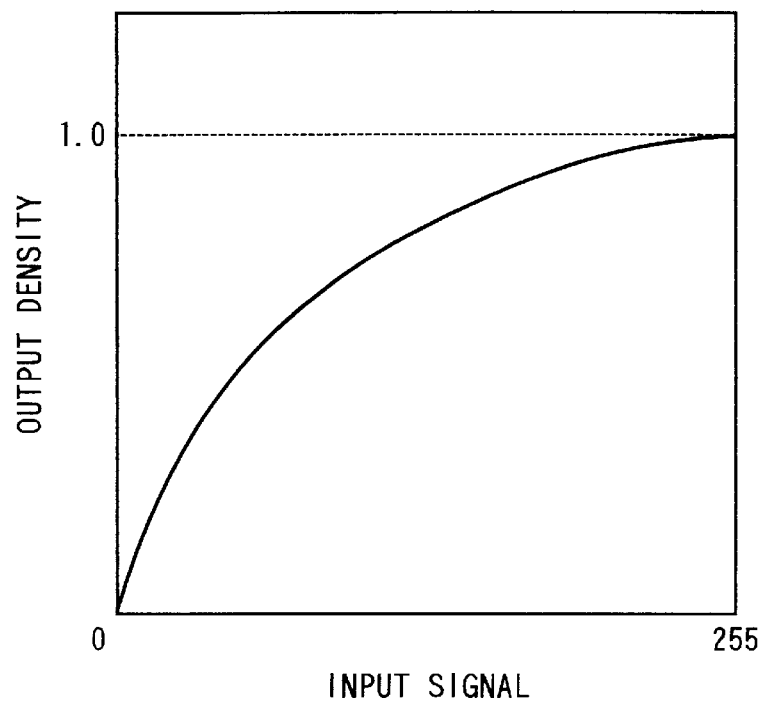
FIGS. 10A and 10B show density characteristics of the recording heads used in the first embodiment of the present invention.
Figure 10B:
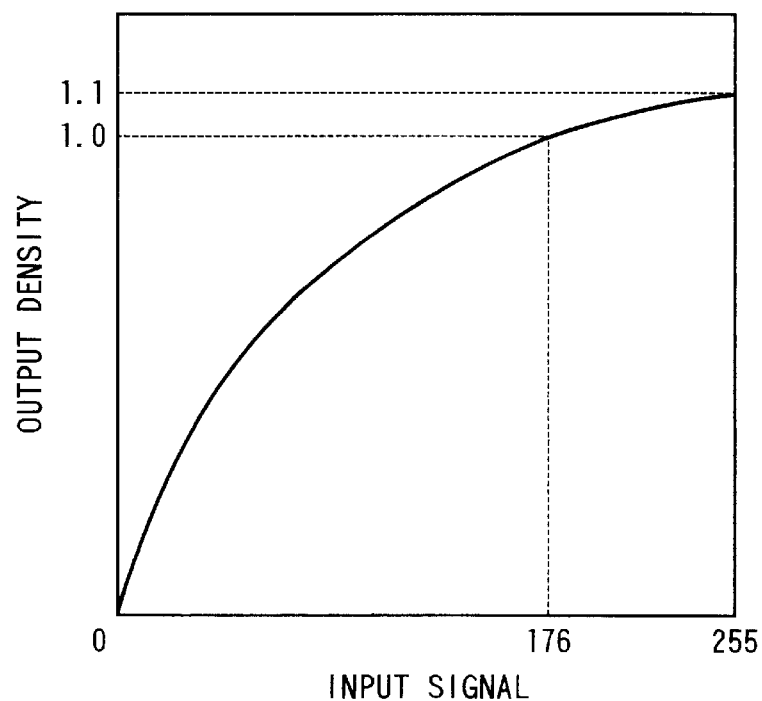

A construction which is a characteristic of the present invention is now explained. FIGS. 10A and 10B show density characteristics of the two heads 4A and 4B used in the present embodiment, respectively. The density characteristics is a density measured in average for a group of ink dots formed by the discharges by the discharge ports for each color of the recording heads although the definition of the density characteristic is not limited thereto. For example, the density of each dot may be measured for each discharge port and it may be taken as the density characteristic.

As shown in FIGS. 10A and 10B, an input signal in the present embodiment is 8-bit data (0 to 255) corresponding to 256 tones, and the density characteristic of the head 4A tends to be outputted lower than that of the head 4B for this signal value. For example, when the signal value is 255, the head 4B produces the density (OD) of 1.1 while the head 4A produces a lower density of 1.0.

Figure 1A:
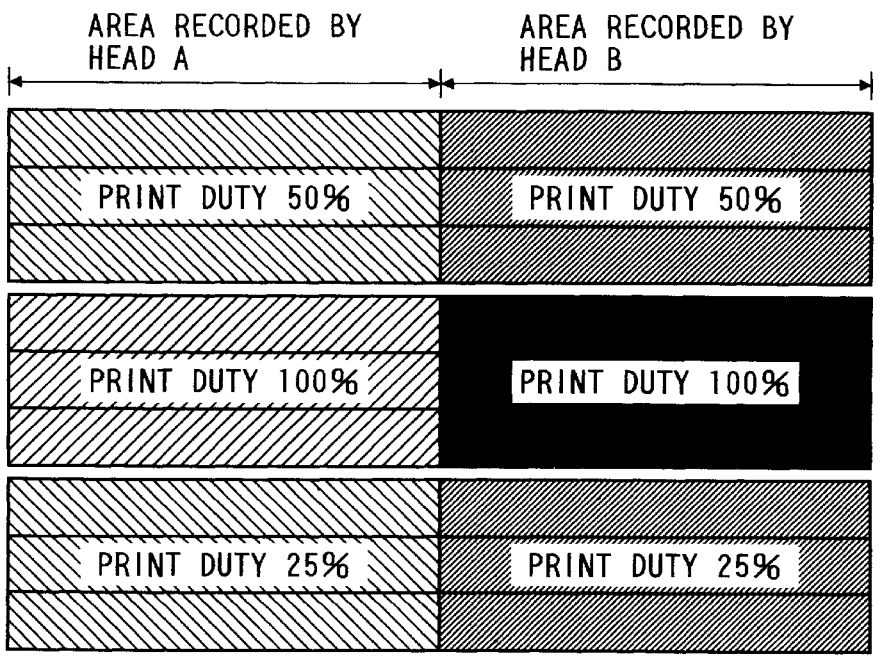
FIGS. 1A and 1B show density variations by prior art multi-recording heads.
Figure 1B:
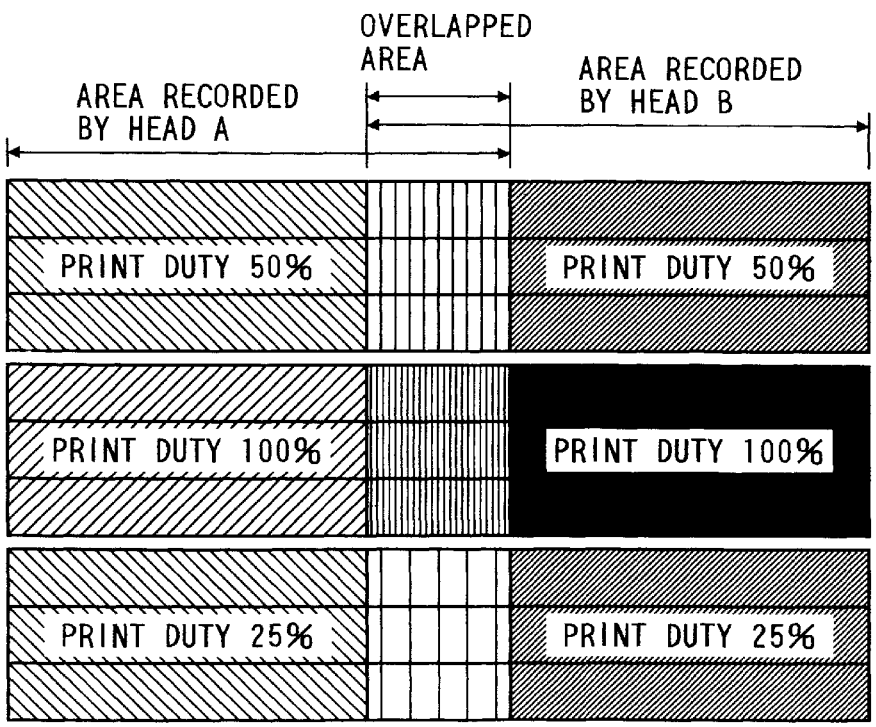

When such two heads are used, in the recording system in which the overlapping recording area is not provided, the density difference of the heads is clearly recognized in the image as shown in FIG. 1A. When the overlapping recording area is provided, a stepwise change in the density is recognized in the image as shown in FIG. 1B. Further, even if the thinning masks for the heads in the overlapping recording area are constructed as shown in FIG. 9, it is highly probable that the density difference may appear between the right side and the left side of the sheet because the density of the area recorded by the recording head 4A and the density of the area recorded by the recording head 4B are different, although the density difference may not be recognized in the boundary at which the densities are switched.

On the other hand, in the present embodiment, the input signal is corrected so that the output of the head 4B is always identical to the output density of the head 4A. Specifically, the input signal to recording head 4B is converted to a signal value which is anticipated to produce the equal output density as the output density of the recording head 4A when the same signal is inputted to the recording head 4A.

In FIG. 10A, the output density of the recording head 4A for the input signal 255 is 1.0 and an input signal value in the recording head 4B which produces the equal output density is 175 as shown in FIG. 10B. Accordingly, by making the record after the process of converting the input signal 255 to 176, both of the recording heads 4A and 4B produces the equal density of 1.0.

In this manner, in the present embodiment, the output densities of the plurality of heads are adjusted by reducing the output value of one of the heads of the two types which outputs higher density. Namely, since the head of the lower density cannot output at the density higher than the upper limit, it is not possible to match it to the output density of the head which output the higher density.

Figure 11A:
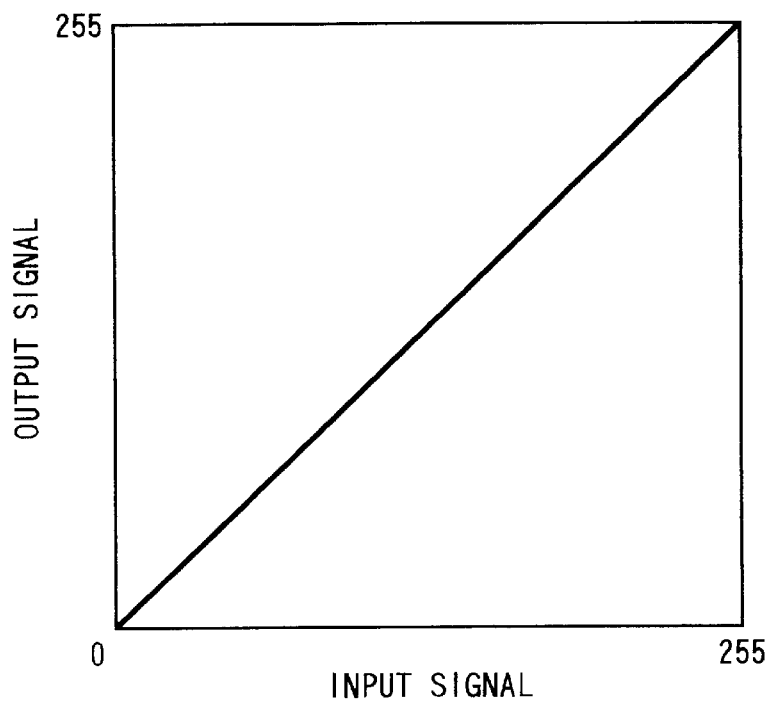
FIGS. 11A and 11B show signal value correction of the respective heads having the above density characteristics.
Figure 11B:
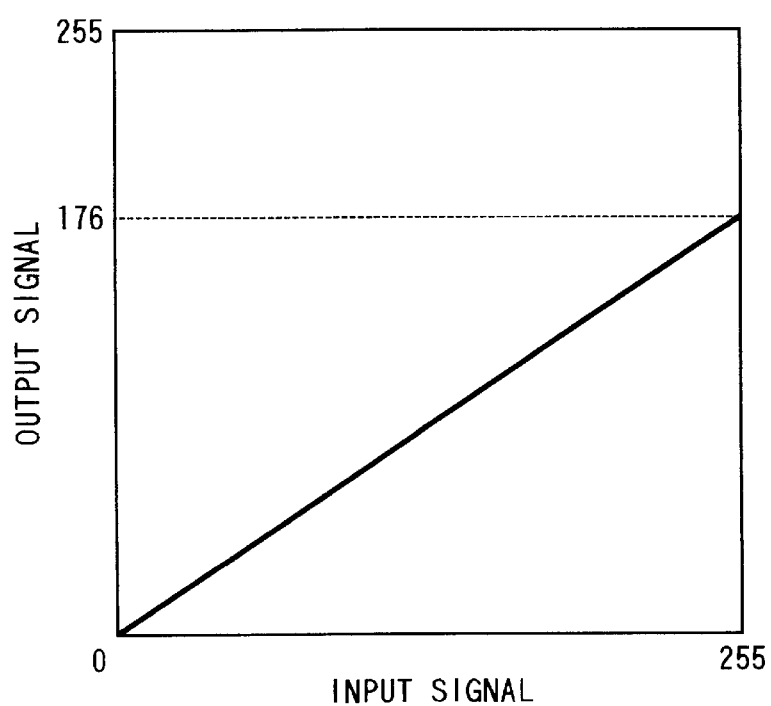

In the signal value conversion of the head 4A, the conversion is made such that the input signal is equal to the output signal as shown in FIG. 11A while in the recording head 4B, linear conversion is made such that the output signal is substantially equal to (176/255)×input signal as shown in FIG. 11B.

The input signal and the output node is not always in a linear relation but depicts a smooth curve as shown in FIGS. 10A and 10B. Thus, the signal value correction in the conversion as shown in FIG. 11B is, strictly speaking, not proper. More precise signal value conversion is now explained with reference to FIGS. 12A, 12B, 13A and 13B.

Figure 12A:
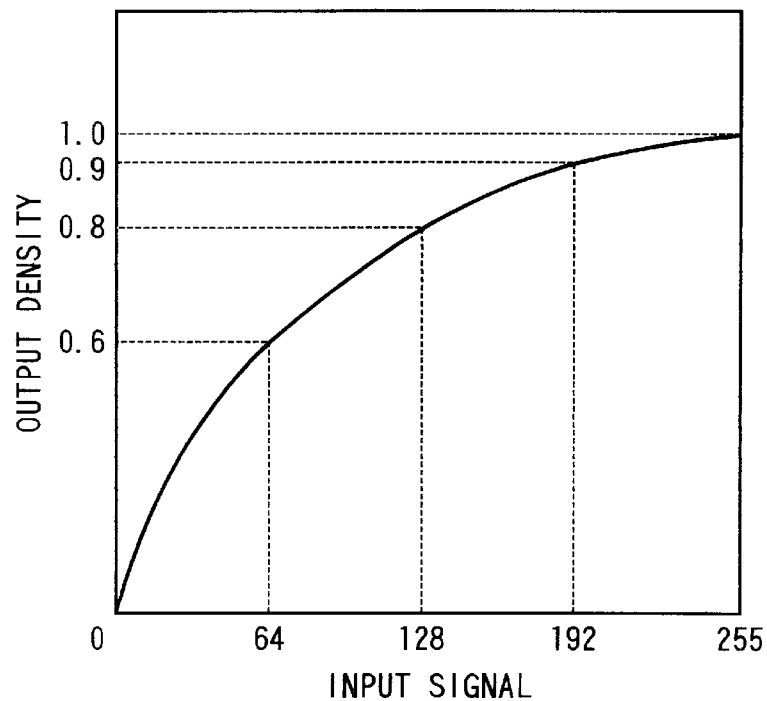
FIGS. 12A and 12B show proper correction curves for the recording heads used in the first embodiment of the present invention.
Figure 12B:
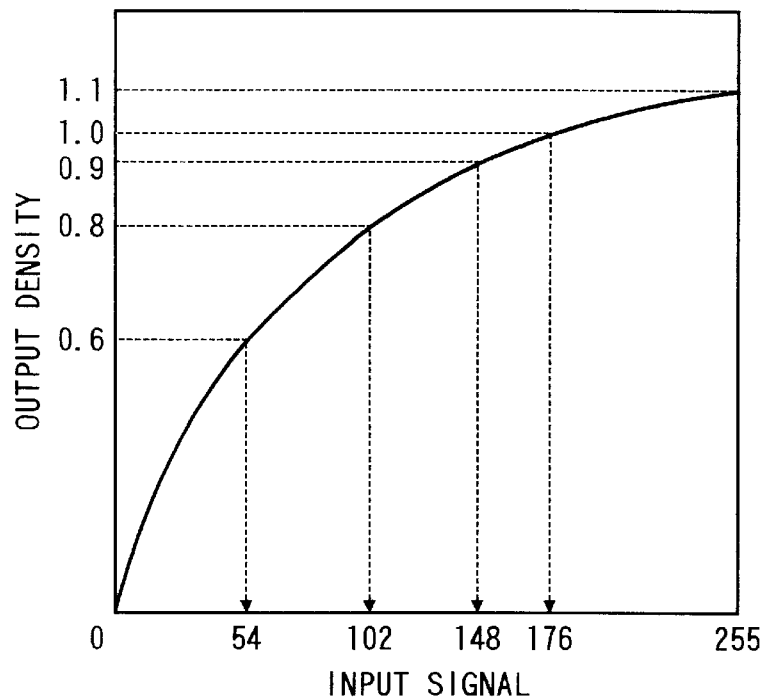
Figure 13A:
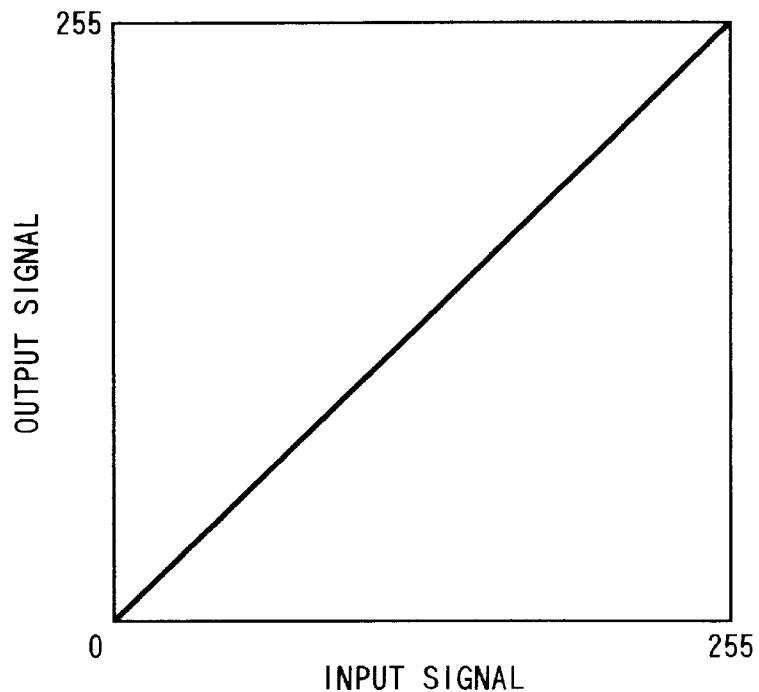
FIGS. 13A and 13B show signal value correction of the respective heads corresponding to the density characteristics shown in FIG. 12.
Figure 13B:
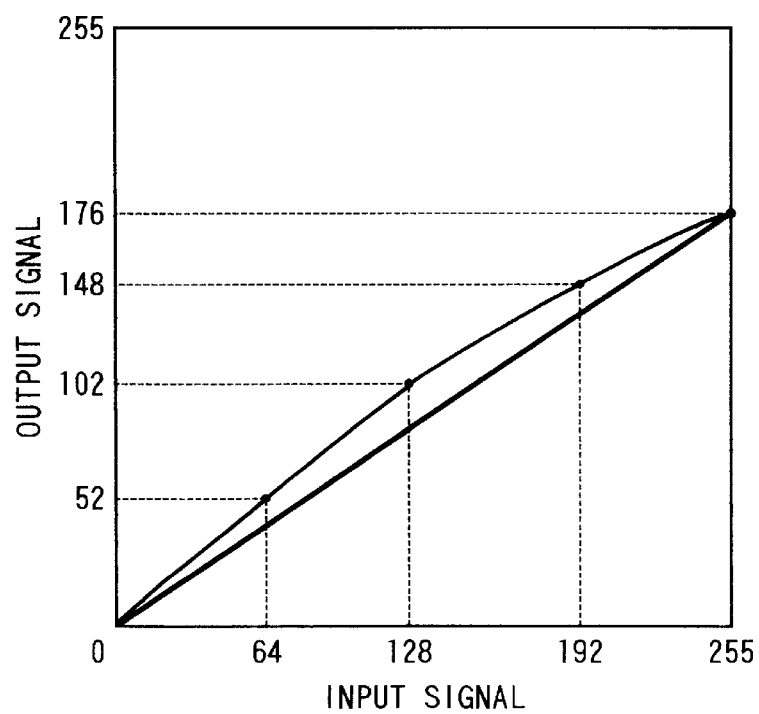

In order to output the equal density by the recording heads 4B and 4A even for the input signal of not larger than 255, proper correction signals for four input signal values 64, 128, 192 and 255 are determined as shown in FIGS. 12B and 12A which show respective density characteristics. Namely, the signal values of the respective signal values after the proper correction are, 54, 102, 148 and 176. By connecting those, the signal value conversion depicts a gentle curve as shown in FIG. 13B. FIG. 13A shows the signal value conversion of the head 4A. In the present embodiment, the signal value conversion for the input signal is conducted by providing a table of input signals versus output signals.

The two recording heads having the density characteristics shown in FIGS. 10A and 10B have been explained in detail. The correlation of the density characteristics of the recording heads is not of one type but are versatile. In actual, the density characteristic is unique to the individual head and the density characteristic of the head may change with time as the recording is continued. Thus, it is preferable to provide a plurality of correction tables for two heads.

FIG. 14 conceptually shows a plurality of signal value conversion tables in the present embodiment. The figure shows for the recording head 4B. In the present embodiment, eight signal value correction tables for correction curve 1 to correction curve 8 are provided so that eight type of conversions can be made for the relation of the density characteristics of the two recording heads. The applicable table may be properly selected in accordance with the replacement of the heads, the change of the use environment or the aging change.

In the present embodiment, a correction mode is provided in the recording head so that a user may set correction data. FIG. 15 shows a flow chart of a process in the correction mode. When the process in the correction mode is started, the recording head first conducts the recovery operation for the two recording heads (S2101). Thus, the discharge condition of the heads is well recovered and a stable discharge condition is attained.

Figure 16:
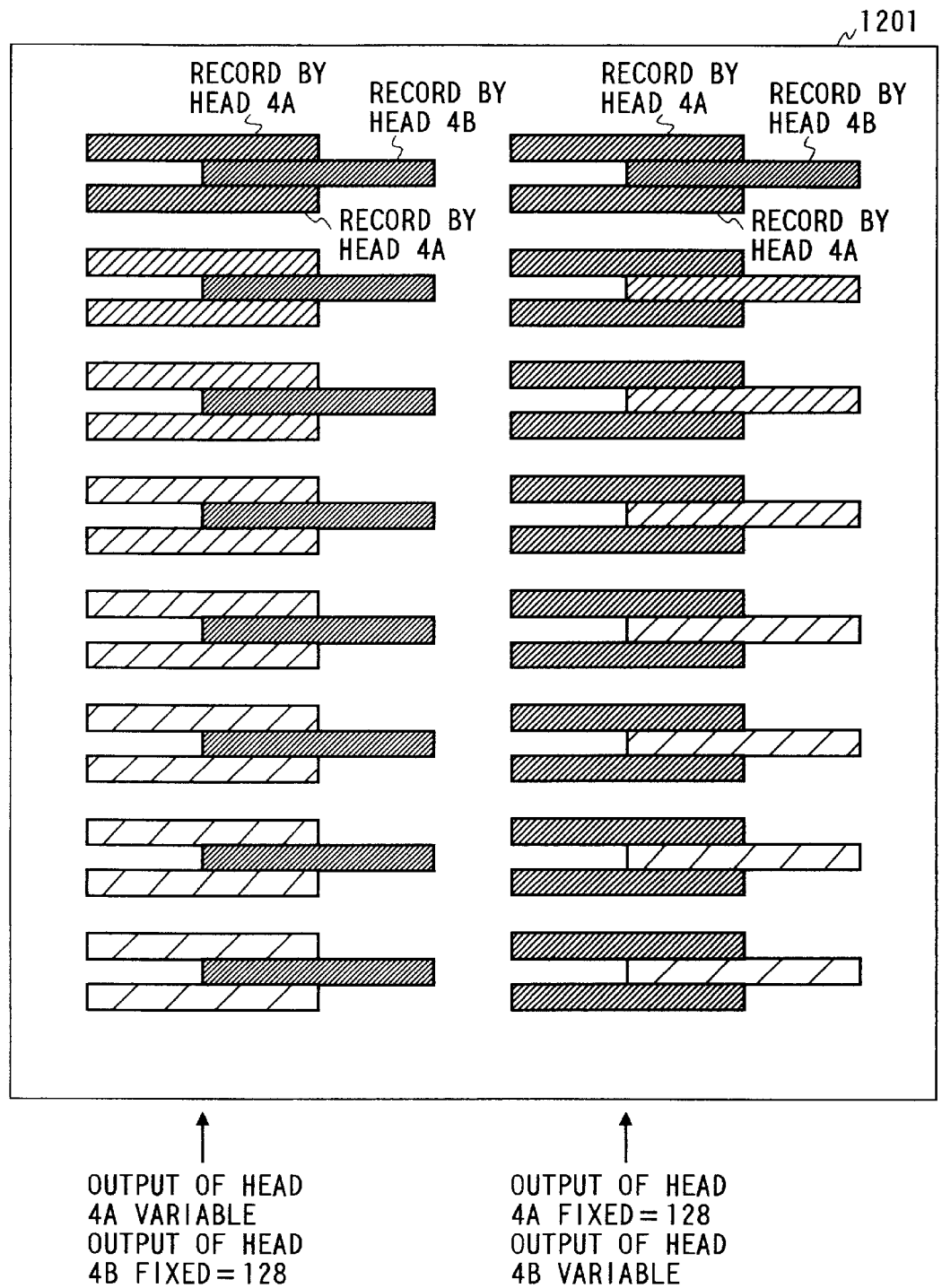
FIG. 16 shows a test pattern outputted in the correction mode.

Then, a test pattern is recorded on a recording medium 1201 as shown in FIG. 16 (S2102). In the present embodiment, in order to assure that a difference between the output densities of the heads in the test pattern is most recognizable by visual sense of human eye, the comparison is made at a density near the signal value 128. As shown in FIG. 16, the test pattern of the present embodiment has arrangement of 16 pattern in total each comprising two bands to be recorded by the recording head 4A and one pattern therebetween to be recorded by the recording head 4B. Each band is recorded by black ink and the width corresponds to all discharge ports for black arranged on the head.

The patterns arranged on the left side in the drawing are recorded as they are by using the signal value 128 in the head 4B. On the other hand, in the head 4A, the recording is made by signals after the signal value conversion of the input signal 128 in accordance with the correction curves 1 to 8 shown in FIG. 14. On the other hand, the right side column uses the input signal to the recording head 4A as it is and the signals of the recording head 4B uses those after the signal value conversion by the correction curves 1 to 8. As described above, when the recording head 4B has a characteristic to output higher density than the recording head 4A, a pattern which assures that the output densities of the head 4A and the head 4B are substantially equal on the right side pattern of FIG. 16 may be selected.

Figure 17:
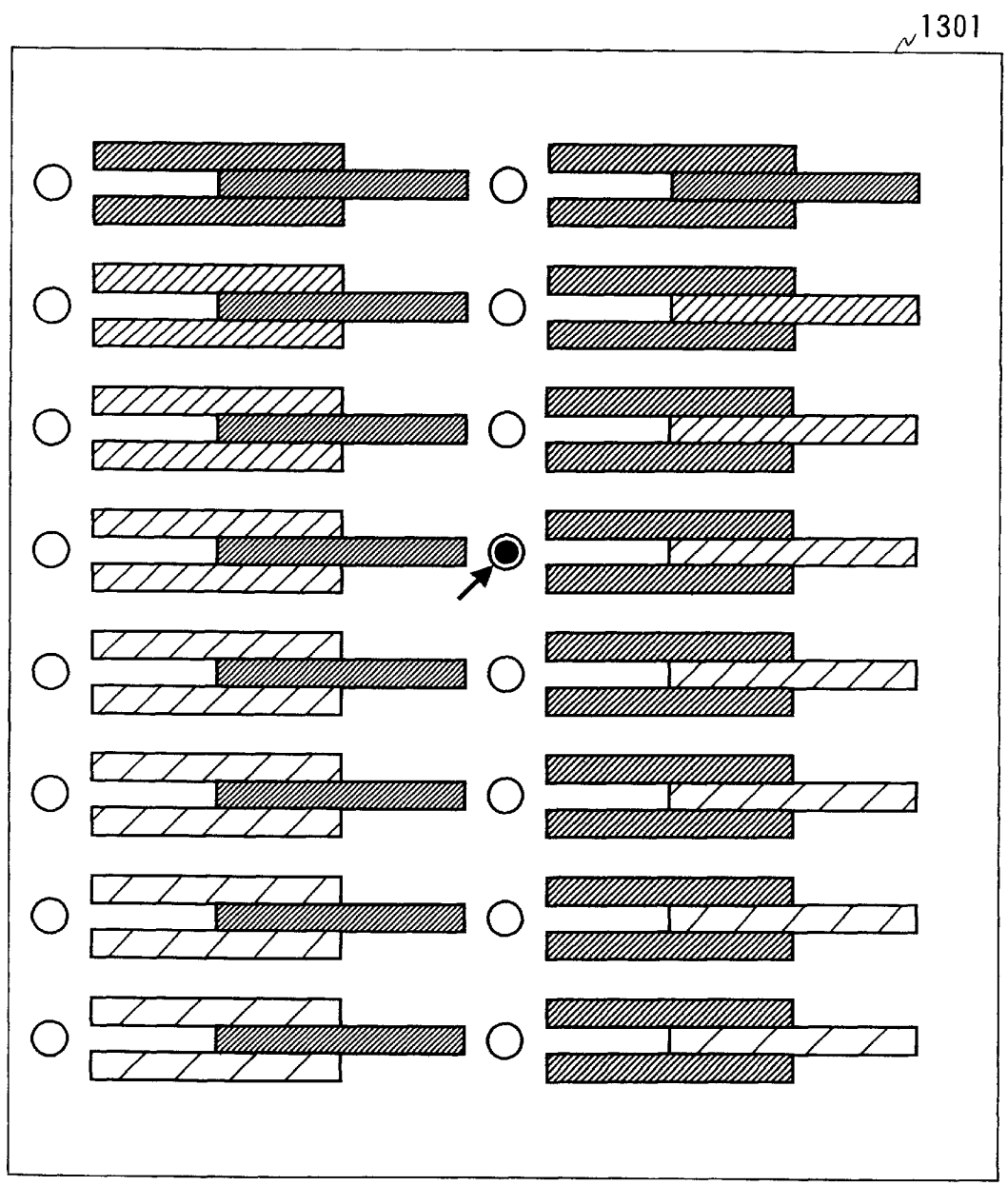
FIG. 17 shows an image of a printer driver in the correction mode.

When the output of the test pattern is completed, an image as shown in FIG. 17 is displayed on a driver screen 1301 of the host computer. Thus, the user may confirm the output pattern, select the pattern having smallest density difference between the heads and input data by clicking by a cursor (S2103). It is now assumed that the position shown by an arrow in the drawing is selected by the user. Since the correction curve of the selected pattern is derived by conducting the signal value conversion of the correction curve 4 for the recording head 4B, the correction table data is held in the apparatus so that the input value conversion of the correction curve 4 may always be conducted for the recording head 4B by the operator of the user (S2104). In this manner, the process of the correction mode is completed.

The held table data is held in the apparatus until a new correction mode process is conducted and the content thereof is updated, and the signal value conversion by the correction curve 4 is always conducted for the recording head 4B during the record mode.

Figure 18:
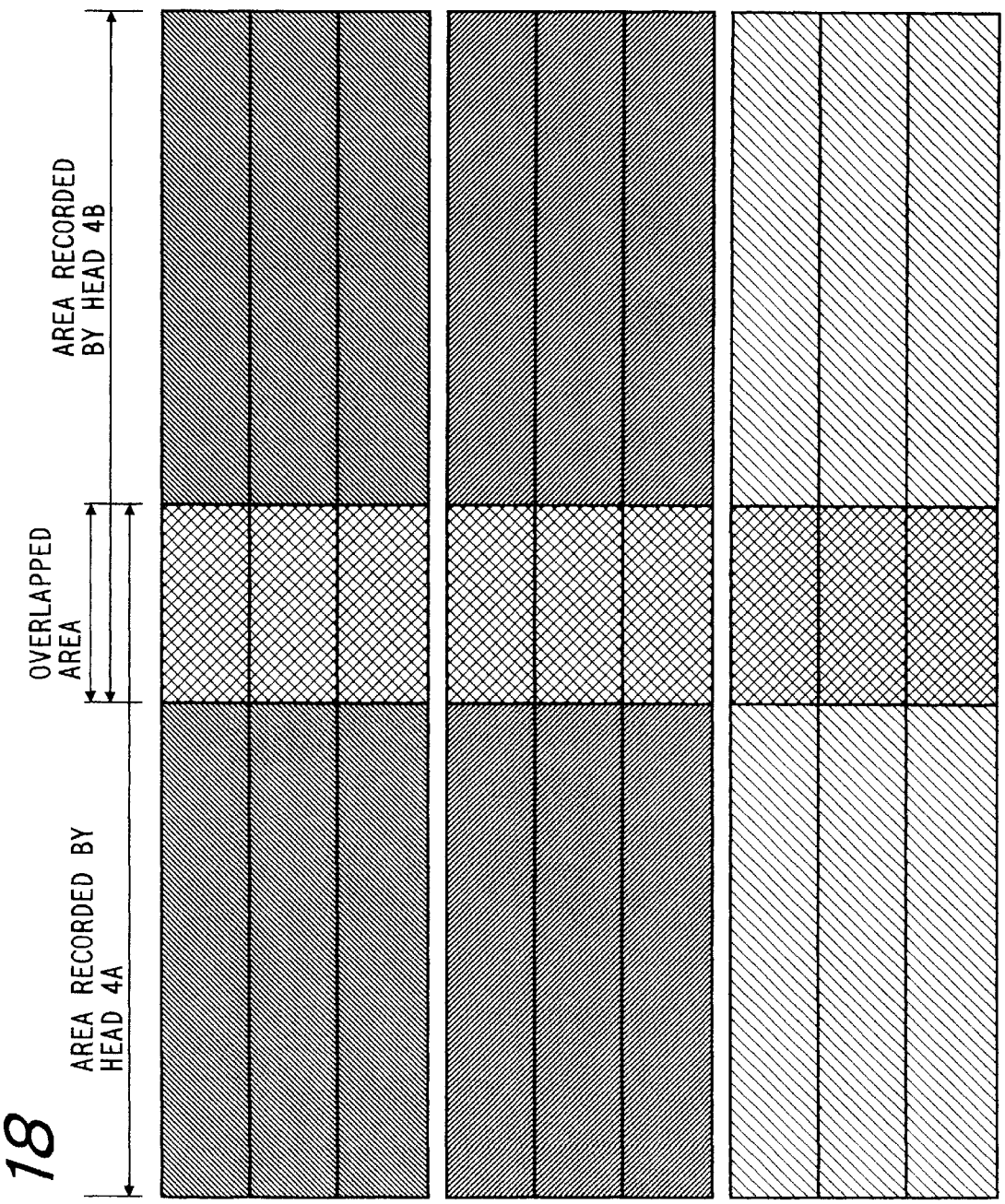
FIG. 18 shows a record result by the first embodiment of the present invention.

In the recorded image in the present embodiment, the record density difference between the left side and the right side which is recognized in the image by the prior art shown in FIGS. 1A and 1B is not recognized, and a uniform image in all recording duties is attained as shown in FIG. 18.

In the present embodiment, the record pattern used in the correction mode uses only the black ink and the correction is made based on the result determined by only the output of the discharge ports which discharge the black ink although the application of the present invention is not limited thereto. For example, the correction pattern may be recorded in all colors of the inks, and a correction curve may be selected for each color independently. However, since the heads used in the present embodiment are integrally formed with the discharge ports of the respective colors being in one head, the correction for all colors may be made by the decision for only the black ink which is most recognizable for the density difference. Thus, the memory and the correction mode may be simpler than when all colors are corrected.

Figure 19:
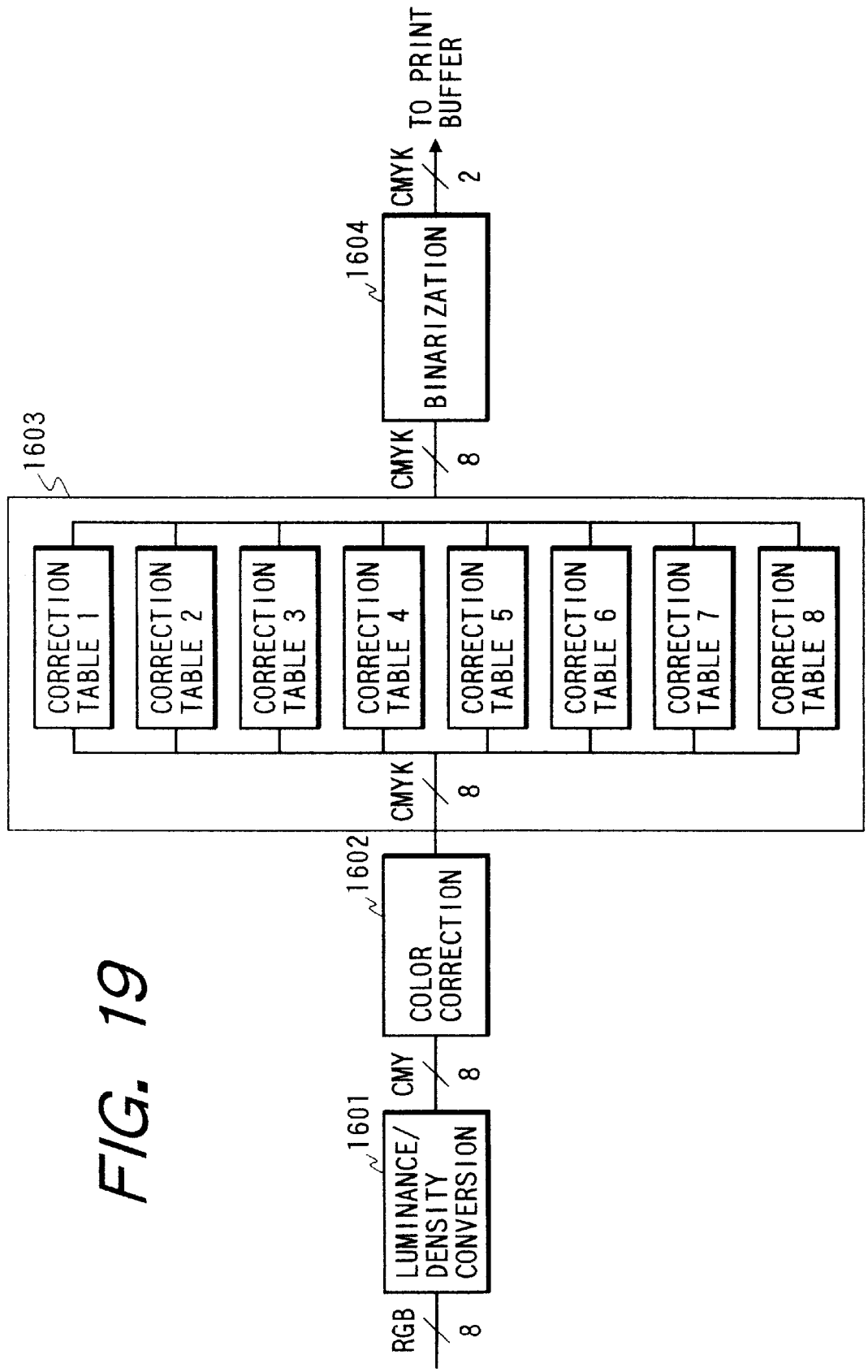
FIG. 19 shows a block diagram of signal value conversion in the printer drive used in one embodiment of the present invention.

A data flow when an actual image is recorded is explained with reference to FIG. 19. FIG. 19 shows a block diagram of a process of the signal value conversion by the printer driver in the host computer of FIG. 19.

Intensity signals R, G and B handled by the host computer are usually subjected to an intensity density conversion 1601 by the printer driver. Thus, the intensity signals R, G and B are converted to 8-bit density signals for the ink color signals C, M and Y, respectively. Since the recording head is usually provided with the black ink, the black data is extracted from the CMY data by the subsequent color correction 1602. In the color correction 1602, a correction for a deviation of the ink color unique to the printer, a correction in accordance with a color generation characteristic unique to a medium determined by a type of the recording medium, and a proper correction in accordance with the application desired by the user are conducted for each color signal to always output an image of proper tone.

Then, the signal value conversion 1603 which is the feature of the present embodiment is conducted. In the present embodiment, the correction curve for the input data is variable in accordance with a column address allocated in the scan direction of the recording head.

Figure 20:
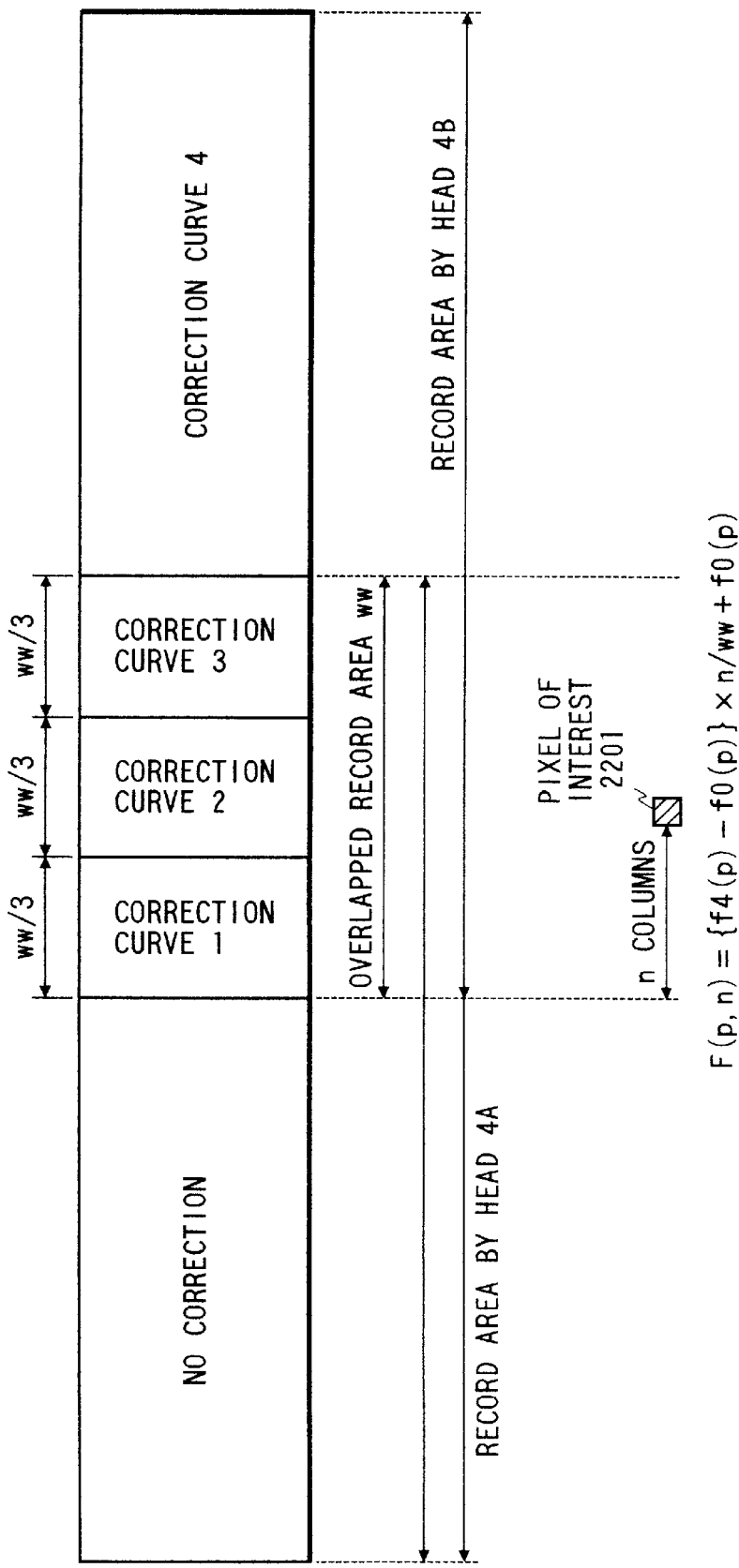
FIG. 20 illustrates signal value correction in the overlapping recording area described in the first embodiment of the present invention.

This method is explained with reference to FIG. 20. As described above, when the correction table 4 is selected for the recording head 4B, the recording area of the recording head 4A is not corrected and only the recording area of the recording head 4B is subjected to the signal value conversion by the correction curve 4. However, a special process is applied to the signal corresponding to the overlapping recording area. In the present embodiment, since the correction of the recording head 4B is made by the correction curve 4, the overlapping recording area is divided into three equal parts in the column direction, and the tables of the correction curve 1, the correction curve 2 and the correction curve 3 are applied in the order starting from the head 4A. If the signal value conversion of the recording head 4B is a correction curve 5, the overlapping area is divided into four equal parts and the correction curve 1 to the correction curve 4 are allocated. In this manner, the recording areas by the both heads may be smoothly joined in the overlapping recording area.

The conversion signal of the overlapping recording area may be determined in the following manner. In a pixel of interest 2201 shown in FIG. 20, it is assumed that the address is positioned at the n-th column from the left end of the overlapping recording area and the input signal value p is applied. When this signal value is recorded by the recording head 4A, the correction is not made and the output signal value after the correction is f0(p)=p. When the record is made by the recording head 4B, the correction curve 4 is applied and the output signal after the conversion is f4(p). In the present method, the correction output signal is determined by a function having a gentle slope along the record position (column position) in the overlapping recording area for the signal values of the both heads. Namely, the output signal value F(n, p) of the n-th pixel of interest 2201 may be determined by F(n, p)={f4(p)−f0(p)}×n/WW+f0(p)

Thus, the recording areas of the both heads may be smoothly joined in the overlapping recording area.

Referring again to FIG. 19, after the completion of the above correction conversion, the 8-bit multi-value signal is converted to a binary signal by a binarization process 1604 and it is sent to the prior buffer of the recording head.

Figure 21:
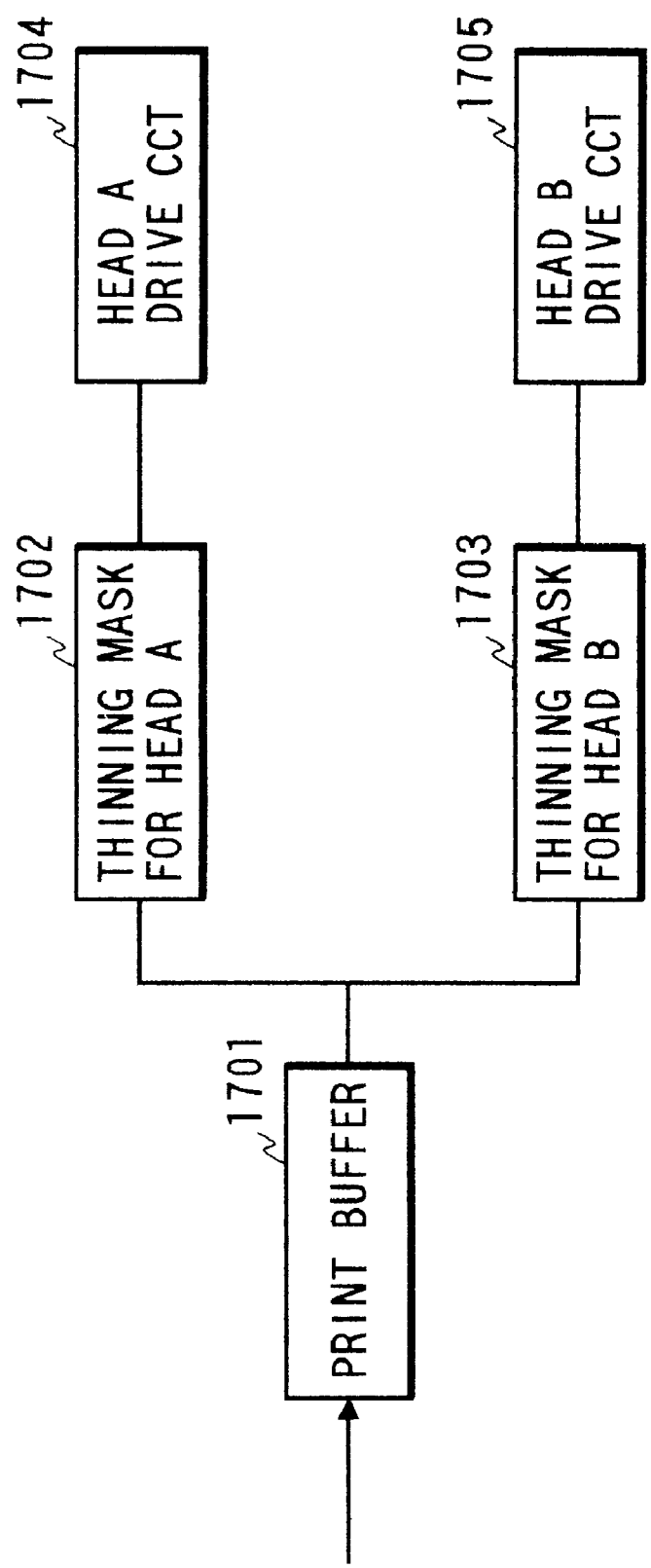
FIG. 21 shows a block diagram of signal value conversion in the recording head in accordance with the first embodiment of the present invention.

A flow of a process in the recording head of data transferred from the host computer is explained with reference to FIG. 21.

Figure 22:
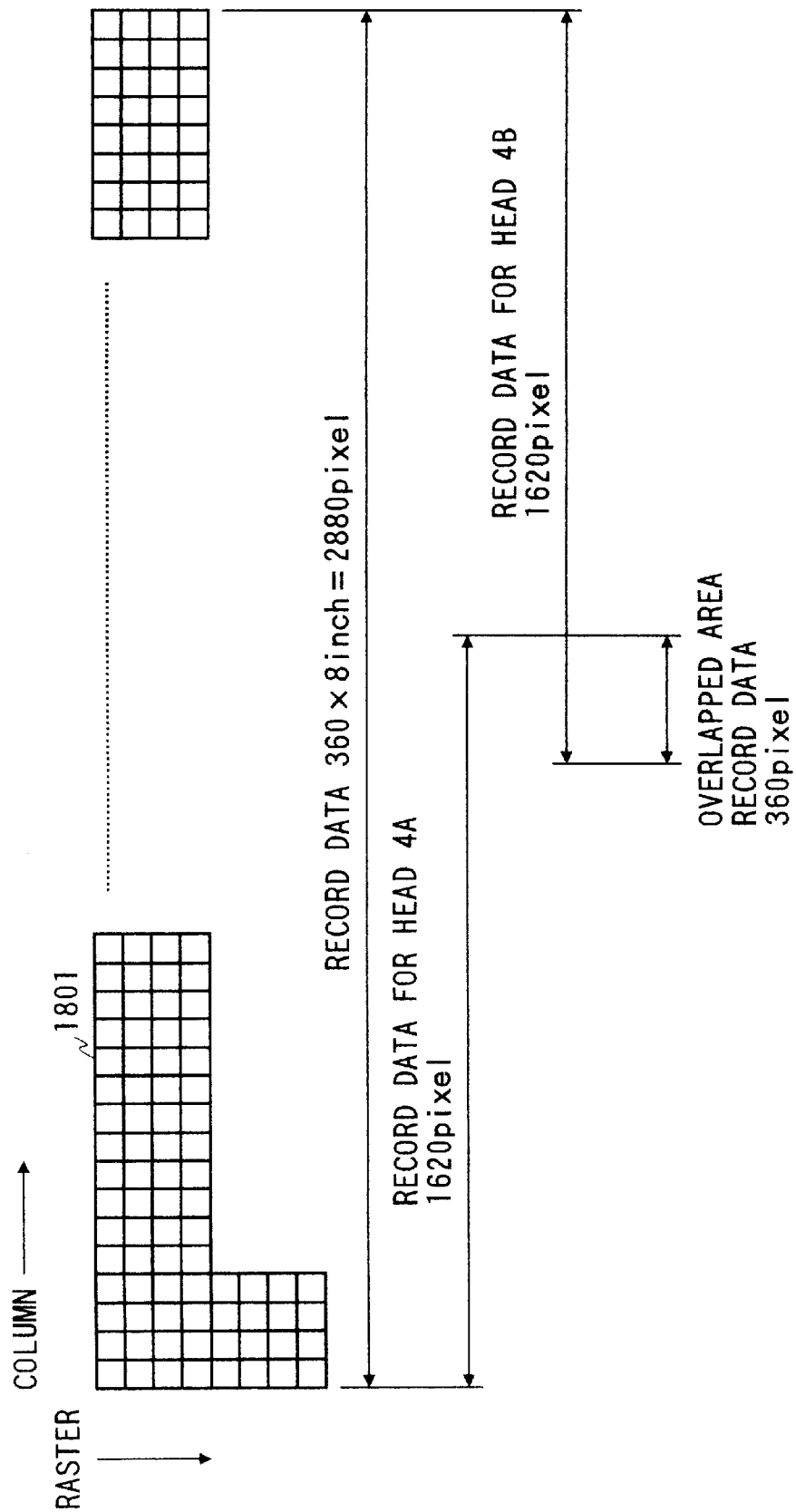
FIG. 22 illustrates rasterization of a print buffer in one embodiment of the present invention.

The binarized record data is rasterized and stored in the print buffer 1701 of the recording head. FIG. 22 shows a manner thereof.

The storing of the record data into the buffer is conducted for each scan. Data corresponding to the number of discharge ports are arranged in the raster direction and the binary data of 360×8=2880 pixels for the recording area width of 8 inches at 360 dpi are arranged in the column direction, although the latter number may change depending on the width of the recording area and the resolution. Referring again to FIG. 21, the rasterized data is divided into record data for the head 4A and record data for the head 4B. Namely, for the rasterized data, 1620 pixels excluding the overlapping area shown in FIG. 22 are divided as they are, and the overlapping area is divided by the respective masks 1702 and 1703. The thinning method in the overlapping area uses one of the methods shown in FIG. 9. When the thinning is made by the method shown in FIGS. 8A and 8B, an intermediate correction curve 4 may be allocated to the overlapping area.

The respective output data are transferred to the drive circuits 1704 and 1705 of the respective recording heads to complete the recording by one record scan.

The signal value conversion and the record scan are conducted for each record scan, and the predetermined sheet feed scan is conducted after each record scan. These scans are sequentially repeated to complete the image of the entire sheet.

In accordance with the recording method of the present embodiment described above, in a serial printer having two recording heads arranged in the scan direction of the carriage, an image of uniform density over the entire recording area without a density difference between the recording areas of both heads is attained.

In the ink jet recording system, as shown in FIGS. 10A, 10B, 11A, 11B, 12A, 12B, 13A and 13B, the output density does not always linear to the input signal. Thus, it is usually corrected by conducting an independent signal value conversion called a printer gamma correction before the binarization process. In the present embodiment, it may be provided as an independent function or table before the binarization process. Alternatively, a correction table containing an effect of the printer gamma correction may be provided in each correction curve. In this case, it is necessary to add a correction curve 0 having the effect of the printer gamma correction for the low density head which has heretofore been handled without correction.

[Second Embodiment]

A second embodiment of the present invention is now explained.

In the first embodiment described above, in two types of recording heads having different densities, the head 4A having a higher density is matched to the head 4B having a lower density to match the output nodes of the both heads. In this case, however, since the signal value conversion to lower the density is conducted, a sufficient output density may not be produced. In the present embodiment, the output density of the recording head 4B having the high density is maintained while using the same recording heads as those of the first embodiment.

Figure 23A:
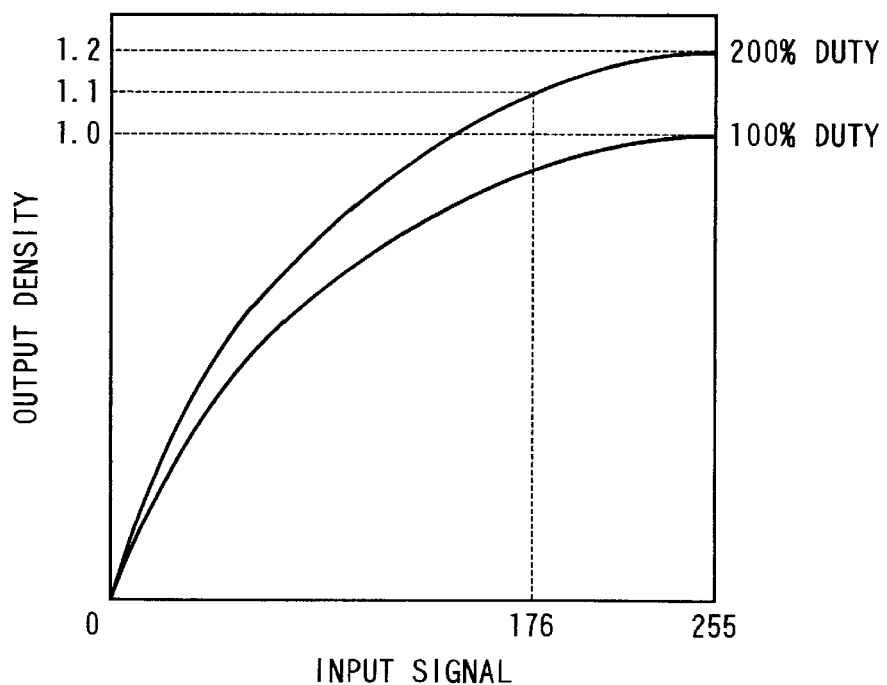
FIGS. 23A and 23B show density characteristics of the recording heads used in the second embodiment of the present invention.
Figure 23B:
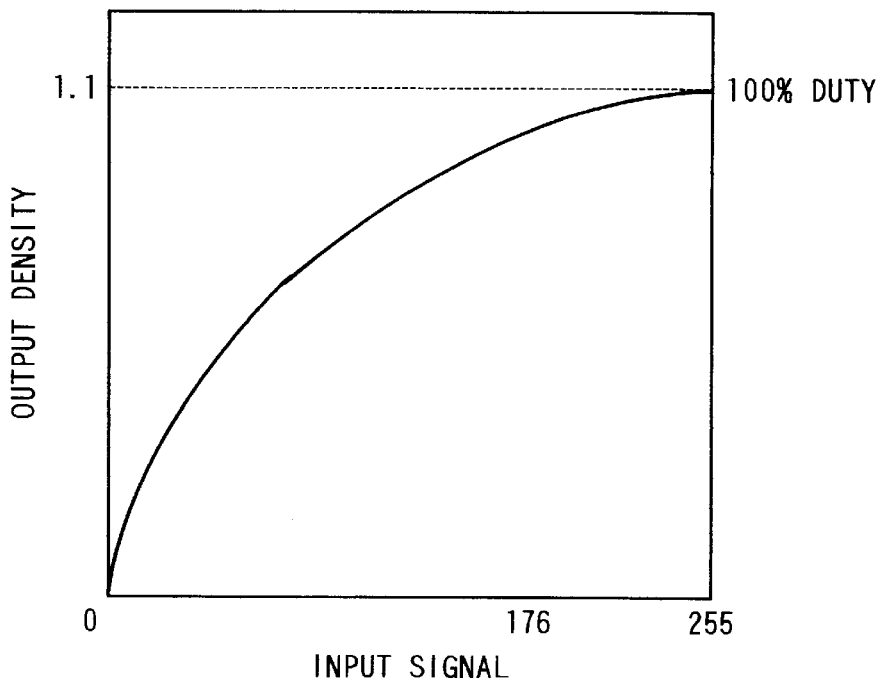

FIGS. 23A and 23B show output densities of the respective recording heads similar to those used in the first embodiment. FIG. 23A shows the output density of the recording head 4A and shows an output density when recorded at 100% duty and an output density when recorded at 200% duty. In the 200% recording, one line is scanned twice in the apparatus (printer) based on the record data after the binarization to conduct the recording by two dot for each pixel. For the recording head 4A, in the 100% recording, the density up to only 1.0 is attained, but in the 200% recording, the density curve up to 1.2 is attained. In the present embodiment, it is assumed that only the recording head 4A records two dots for the record data so that the recording head 4A is of high output density than the recording head 4B. As opposed to the first embodiment, the correction is made to the recording head 4A to match the output density to that of the recording head 4B.

As shown in FIG. 23A, the output density of the recording head 4A is 1.2 by the input signal 255 in the 200% recording. On the other hand, the output node of the recording head 4B remains at 1.1. Accordingly, it is necessary to convert the signal value 176 in order to make the output density of the recording head 4A to 1.1

Figure 24A:
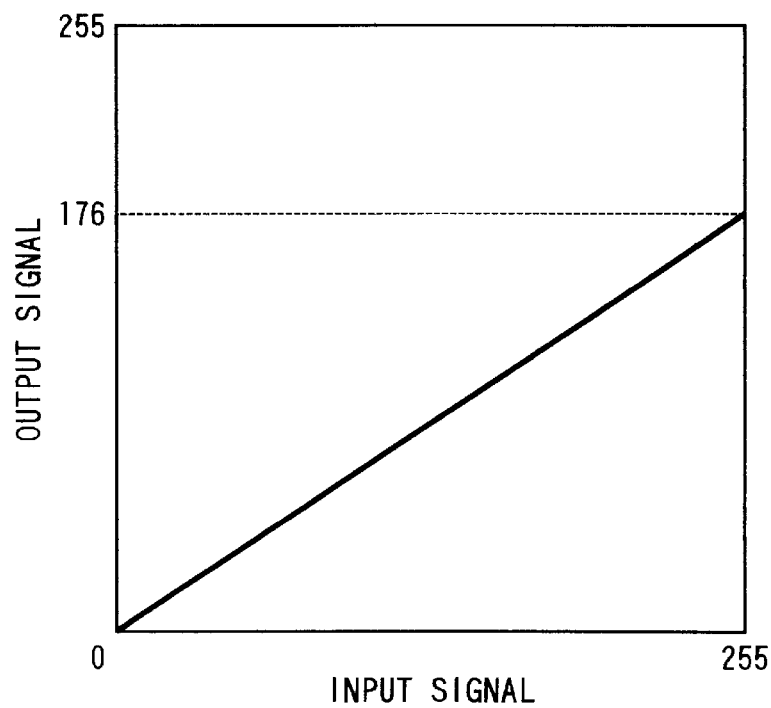
FIGS. 24A and 24B show signal value correction of the respective heads having the above density characteristics.
Figure 24B:
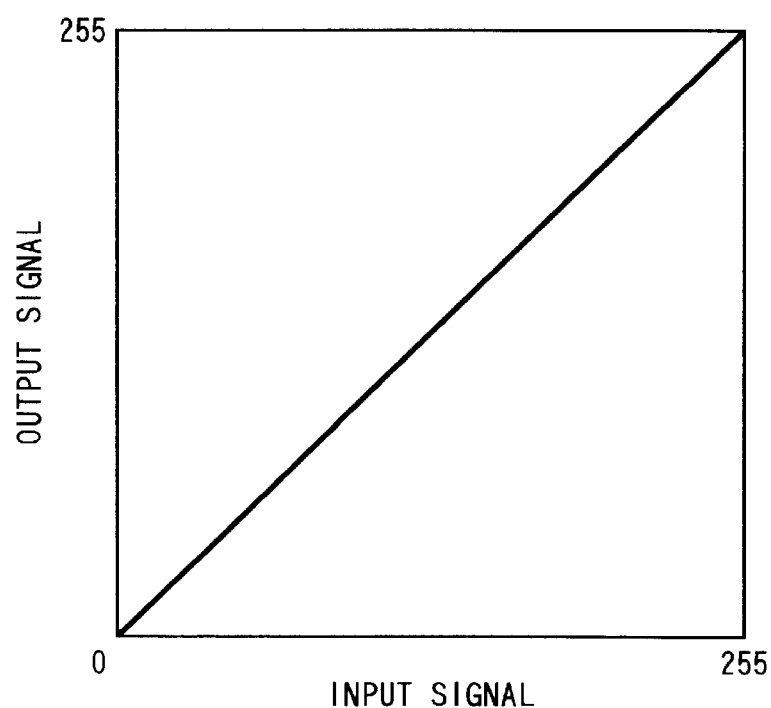

As shown in FIG. 24A (the output characteristic of the recording head 4A), the correction curves for the recording head 4A may be identical to those of the first embodiment (correction curves 1 to 8). In the present embodiment, the correction mode explained in FIGS. 16 and 17 may be provided as it is in the first embodiment, or the present embodiment may be set to an enhanced mode bases on the data acquired in the first embodiment and the correction determined by the characteristic of the recording head may be automatically set. It is assumed here that the table conversion by the correction curve 4 is proper for the recording head 4A and the signal value conversion shown in FIGS. 24A and 24B (the output characteristic of the recording head 4B) is conducted in the present embodiment as it is in the first embodiment and the data is transferred to the recording head.

When the recording is made twice for each record pixel as it is done by the recording head 4A in the present embodiment, it is necessary to make the moving velocity of the recording head for the same recording area to one half or conduct the recording scan two times. In the present embodiment, a known divided recording system is used to conduct the recording scan two times for each recording area.

Referring to FIGS. 25A to 25D, the recording operation of the present embodiment is explained. For the simplification of the explanation, it is assumed here that a monochromatic image is recorded by one recording head.

Figure 25A:
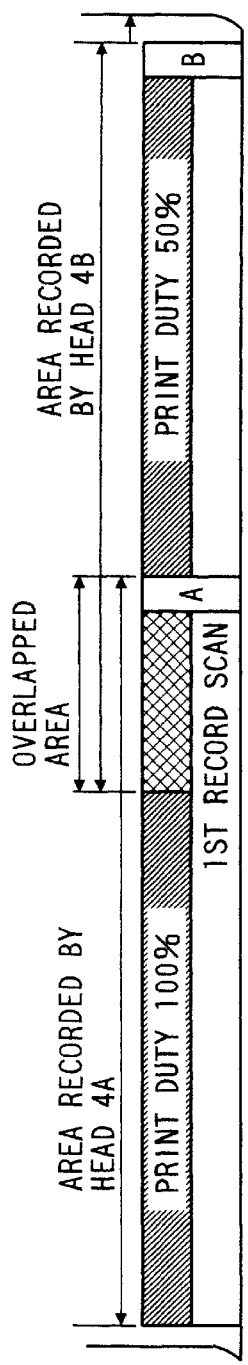
FIGS. 25A, 25B, 25C and 25D illustrate recording operation in the second embodiment.

In a first recording scan, as shown in FIG. 25A, the recording is made only by a lower half of the discharge ports of the recording head. At this time, the recording head 4A records the 100% record data by the record data after the correction conversion. On the other hand, the recording head 4B records the data thinned to 50%, of the entire data. After the recording scan, the sheet is fed by one half of the discharge port arrangement width of all discharge ports of the recording head.

Figure 25B:
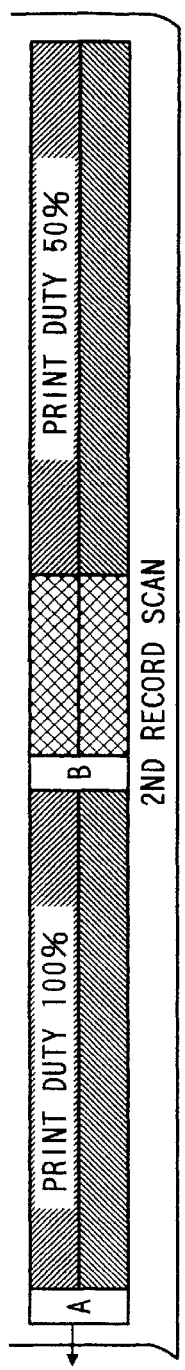

Then, in a second recording scan, as shown in FIG. 25B, the recording scan is made by the both recording heads in the opposite direction to that of the first recording. In the second recording scan, the recording is made by using all discharge ports of the recording head. In this case, the recording head 4A makes the 100% recording of the record data and the recording head 4B record the image thinned to 50%. In this recording scan, the second recording is made by an upper half of the recording elements of the recording head to the area which was recorded in the first recording scan. In this case, for the pixels recorded by the recording head 4A, the second dot of ink is implanted. For the pixels recorded by the recording head 4B, the 100% image is completed by the 50% recording by each of the first recording scan and the second recording scan. In this case, the pixels recorded in the first recording scan and the pixels record in the second recording scan are record in complementary patterns. The record pattern used by the recording head 4B may be a checker pattern as shown in FIG. 8A or other patterns so long as they are complementary.

Figure 25C:
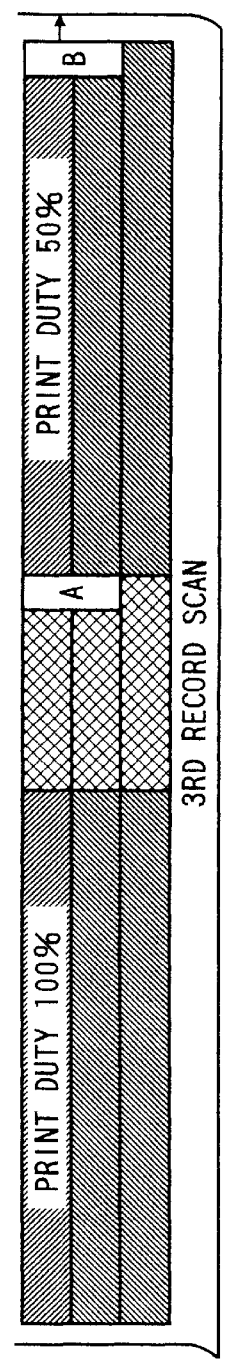
Figure 25D:
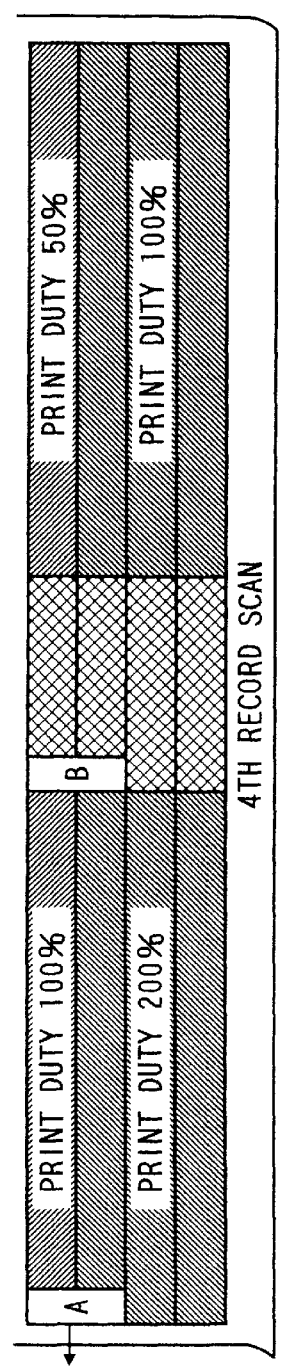

After the second recording scan, the sheet is fed again by one half of the recording width, and the forward recording scan is again conducted by a third recording scan as shown in FIG. 25C. The thinning mask of the recording head 4B is same as that of the first recording scan. By repeating the above recording scan and the sheet feed scan, an image as shown in FIG. 25D is sequentially completed.

In the first embodiment, one discharge port corresponds to the pixel arranged in the same raster in the recording area other than the overlapping area. In this case, the variation in the characteristics of the respective discharge ports in the head may become prominent on the image. For example, when the recording position by one discharge port deviates in a specific direction from those of other discharge ports or a dot diameter is extremely large or small, white stripe or black stripe may appear in the direction of the recording scan. To solve this problem, it has been known to improve the image quality by recording the raster data by the division by different discharge ports as it is in the present embodiment.

Figure 26:
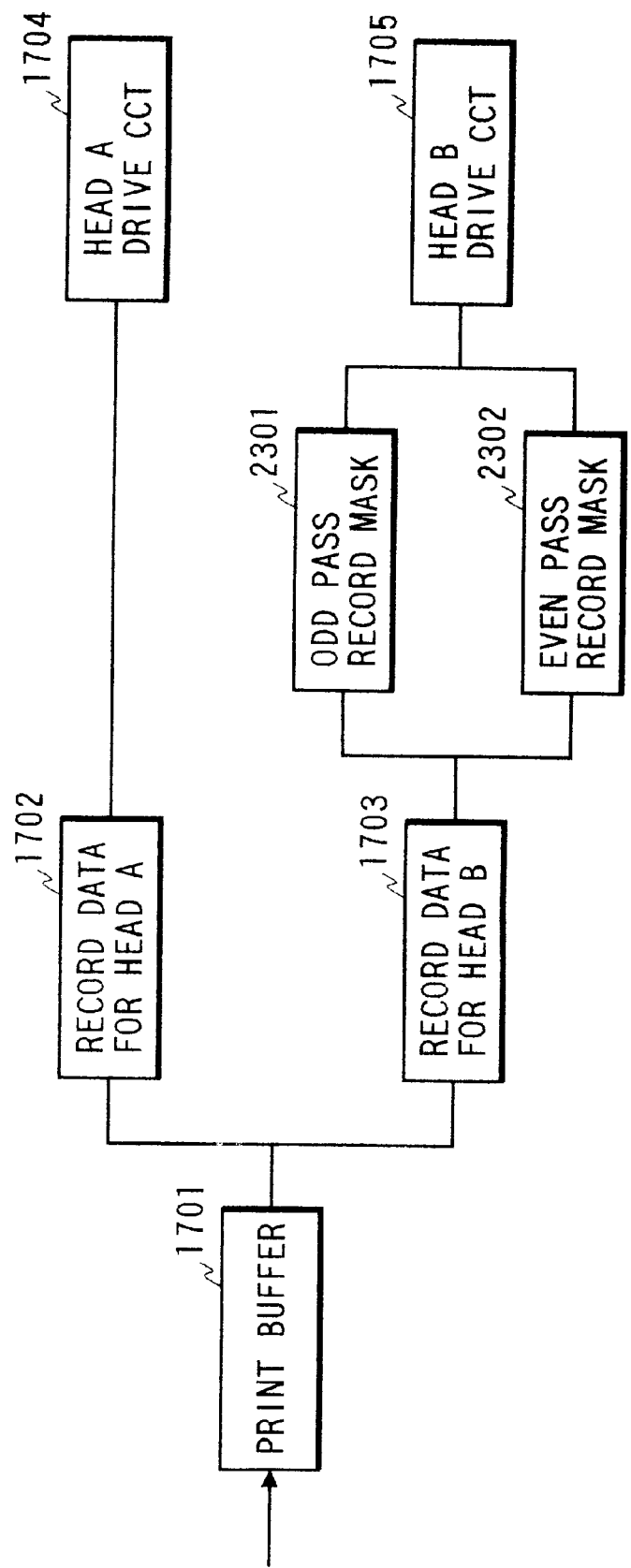
FIG. 26 show a block diagram of signal value conversion in the recording head used in the second embodiment.

FIG. 26 shows a block diagram of a configuration of the signal processing in the printer of the present embodiment.

The record data rasterized in a print buffer 1701 is divided into the record data for the head 4A and the record data for the head 4B as it is in the first embodiment. The record data for the head 4A is sent to the drive circuit as it is but, for the record data for the head 4B, the process of thinning mask is conducted in accordance with the recording scan. In the present embodiment, since the image is completed by two times of scan, two types of thinning masks, a thinning mask 2301 for odd-numbered pass scan and a thinning mask 2302 for even numbered pass scan, are stored in the ROM of the apparatus and they are alternately used for each recording scan and they are sent to the drive circuit of the head 4B.

In the present embodiment, the density adjustment of the two different heads is attained at a higher density than that of the first embodiment. However, as described above, since the recording scan is made twice for the same image area, approximately two times of recording time of that of the first embodiment is needed. Accordingly, it is preferable that the present embodiment and the first embodiment are selectively used depending on the application, and the present embodiment is set as the enhanced mode of high quality.

As described above, in accordance with the present embodiment, the density difference between the two recording heads is corrected at the high density level while conducting the divided recording in the enhanced mode so that smoother and higher quality image is attained.

In the present embodiment, the divided recording by twice has been described although the divided recording by three times may be conducted and the effect of the divided recording is more effective as the number of division increases.

The record duty of the head 4B may be set to 200% like the head 4A and the signal value conversion may be conducted to the head 4B as it is in the first embodiment. In this case, the thinning mask is not needed for any of the heads and the density after the correction is further higher.

Further, the printer gamma correction may be made in the present embodiment as it is in the first embodiment.

In the two embodiments described above, it is assumed that the recording areas of the plurality of recording heads overlaps to each other although the present invention is not limited thereto. The essence of the present invention resides in the application of different corrections (signal value conversions) to the record data for the plurality of recording areas anticipated to be recorded by the plurality of different recording heads. Accordingly, the presence or absence of the overlapping recording area is not basically relevant. When the overlapping recording area is not provided, the recording areas by the plurality of recording heads are discrete but the positions of the boundaries are not prominent so long as the density adjustment of the respective heads is conducted in accordance with the present invention.

An image of a higher quality may be attained by providing the overlapping recording area as shown in the above embodiment and adjusting the thinning masks in that area or additionally providing the correction process of the present invention in the overlapping recording area.

In the above embodiments, the recording head in which two recording heads are mounted is described although the present invention is not limited thereto. Three or more recording heads may be mounted and the correction curve may be independently allocated for each recording head.

Further, the present invention is not limited to the image recording head for recording the binary data. The present invention is applicable to the printer which record a multi-value image and a series of signal processings may be conducted in the printer driver.

In accordance with the present invention, since the input signal value of the recording head may be adjusted independently for each of a plurality of recording areas, the input signal value may be corrected in accordance with the application of the recording heads in the respective recording area and the occurrence of the density difference between areas may be prevented. As a result, the density difference by the characteristics of the recording heads is eliminated over the entire area and a uniform and smooth image may be produced.

What is claimed is:

1. A recording apparatus for recording on a recording medium by using a plurality of recording heads arranged at a predetermined interval in a scan direction across a recording area, each of said recording heads for recording on the recording medium based on a recording signal, said plurality of recording heads capable of recording in at least one common color, said apparatus comprising:

scan means for causing said recording heads to scan corresponding divided recording areas;

record control means for causing said recording heads to record by sharing the corresponding divided recording areas when said scan means causes said recording heads to scan the divided recording areas, so that the entire recording area is recordable by all of said plurality of recording heads in the common color; and correction means for independently correcting said record signals to be inputted to the recording heads corresponding to the divided recording areas to be recorded in the shared manner, for each of the divided recording areas, so that output densities recorded by said plurality of recording heads corresponding to the divided recording areas, are equalized.

2. A recording apparatus according to claim 1, wherein said correction means corrects the record signals based on the output densities of the respective recording heads.

3. A recording apparatus according to claim 2, wherein said correction means includes a correction table for correcting the record signals, and said correction means uses said correction table for the respective divided recording areas.

4. A recording apparatus according to claim 3, wherein the divided recording areas include an overlapping recording area to which said recording heads can record in an overlapping manner.

5. A recording apparatus according to claim 4, wherein said correction means changes stepwise the correction table to be used in the overlapping recording area based on the recording table used in the divided recording areas other than the overlapping recording area.

6. A recording apparatus according to claim 4, wherein said correction means produces a corrected record signal of the pixel for the overlapping recording area by applying a weight corresponding to the pixel position in a scan direction in the overlapping recording area to the corrected record signal derived from the correction table used in the divided recording areas other than the overlapping recording area.

7. A recording apparatus according to claim 2, wherein said correction means converts the record signal to a recording head having a high output density to a lower level in order to match the output density to the recording head having the lowest output density.

8. A recording apparatus according to claim 1, wherein said recording heads record in accordance with binary record signals, and said correction means correct while the record signals are in multi-value state and converts the corrected multi-value record signals to binary record signals.

9. A recording apparatus according to claim 1, wherein said record control means causes at least one of said recording heads to record by a plurality of dots.

10. A recording apparatus according to claim 1, wherein said recording heads record in a plurality of colors on said recording medium.

11. A recording apparatus according to claim 1, wherein said recording heads discharges inks to said recording medium.

12. In an image recording system having a host computer, display means for displaying a process content of said host computer and a recording head for recording on a recording medium by using a plurality of recording heads arranged at a predetermined interval in a scan direction, said recording head comprising:
  scan means for causing said recording heads to scan corresponding divided recording areas;
  record control means for causing said recording heads the record by sharing the corresponding divided recording areas when said scan means causes said recording heads to scan the divided recording areas; and
  correction means for independently correcting record signals to be inputted to the recording heads corresponding to the divided recording areas to be recorded in the shared manner, for each of the divided recording areas, said correction means correcting the record signals in accordance with respective ones of plural correction tables;
  wherein said record control means outputs a test pattern comprising an output pattern of one of said plural recording heads and an output pattern of another of said recording heads holding said output pattern therebetween; and
  wherein said display means displays said test pattern for each of said correction tables.

13. A recording method for recording on a recording medium by using a plurality of recording heads arranged at a predetermined interval in a scan direction across a recording area, each of said recording heads for recording on the recording medium based on a recording signal, said plurality of recording heads capable of recording in at least one common color, said method comprising the steps of:
  causing said recording heads to scan corresponding divided recording areas;
  causing said recording heads to record by sharing the corresponding recording areas when said scan step causes said recording heads to scan the corresponding areas, so that it the entire recording area is recordable by all of said plural recording heads in the common color; and
  independently correcting said record signals for each of the divided recording areas, the record signals being inputted to the recording heads for the divided recording areas to be recorded in the shared manner, so that output densities recorded by said Plurality of recording heads corresponding to the divided recording areas are enlarged.

14. A recording method according to claim 13, further comprising the step of:
  providing a plurality of correction tables for correcting the record signals;
  said correction step using the correction tables for each of the divided recording areas.

15. A recording method according to claim 13, wherein said providing step outputs a test pattern comprising an output pattern of one of said recording head and output patterns of other recording heads holding said output pattern therebetween.

16. A method for transferring a record signal to a recording apparatus for recording on a recording medium by using a plurality of recording heads arranged at a predetermined interval in a scan direction across a recording area, each of said recording heads for recording on the recording medium based on a recording signal, said plurality or recording heads capable of recording in at least one common color, said recording apparatus comprising:
  scan means for causing said recording heads to scan corresponding divided recording areas; and
  control means for causing said recording heads to record by sharing the corresponding divided recording areas when said scan means causes said recording heads to scan the divided recording area, so that it the entire recording area is recordable by all of said plural recording heads in the common color,
  said method comprising the steps of:
    independently correcting the record signal inputted to the recording heads corresponding to the divided recording areas to be recorded in the shared manner, so that output densities recorded by said plurality of recording heads corresponding to the divided recording areas are equalized; and
    transferring the record signal corrected in said correction step to said recording head.

17. In an image recording system having a host computer, display means for displaying a process content of said host computer and a recording head for recording on a recording medium by using a plurality of recording heads arranged at a predetermined interval in a scan direction across a recording area, said plurality of recording heads capable of recording in at least one common color, said recording head comprising:
  scan means for causing said recording heads to scan corresponding divided recording areas;
  record control means for causing said recording heads the record by sharing the corresponding divided recording areas when said scan means causes said recording heads to scan the divided recording areas, so that the entire recording area is recordable by all of said plurality of recording heads in the common color; and
  correction means for independently correcting record signals to be inputted to the recording heads corresponding to the divided recording areas to be recorded in the shared manner, for each of the divided recording areas, said correction means correcting the record signals in accordance with respective ones of plural correction tables;
  wherein said record control means outputs a test pattern comprising an output pattern of one of said plural recording heads and an output pattern of another of said recording heads holding said output pattern therebetween; and
  wherein said display means displays said test pattern for each of said correction tables.

* * * * *

UNITED STATES PATENT AND TRADEMARK OFFICE
CERTIFICATE OF CORRECTION

PATENT NO. : 6,020,976

DATED : February 1, 2000

INVENTOR(S) : Miyuki Fujita, et al.

It is certified that error appears in the above-identified patent and that said Letters Patent is hereby corrected as shown below:

COLUMN 1
      Line 35, change "cause" to --causes--; and
      Line 36, change "generates" to --generate--.

COLUMN 5
      Line 16, change "show" to --shows--.

COLUMN 7
      Line 55, change "the" to --them--.

COLUMN 9
      Lines 15/16, change "characteristics" to --characteristic--; and
      Line 56, change "produces" to --produce--.

COLUMN 10
      Line 3, change "node" to --mode--, and change "is" to --are--;
      line 4, change "depicts" to --depict--;
      line 24, change "In actual" to --In acutality--; and
      line 34, change "type" to --types--.

COLUMN 12
      Line 31, delete the second occurrence of "the"; and
      Line 36, delete the second occurrence of "the".

UNITED STATES PATENT AND TRADEMARK OFFICE
CERTIFICATE OF CORRECTION

PATENT NO. : 6,020,976

DATED : February 1, 2000

INVENTOR(S) : Miyuki Fujita, et al.

It is certified that error appears in the above-identified patent and that said Letters Patent is hereby corrected as shown below:

COLUMN 13
        Line 13, change "does" to --is--;
        Line 31, change "nodes" to --modes--, and delete the second occurrence of "the";
        Line 51, change "high" to --higher--; and
        Line 67, change "bases" to --based--.

COLUMN 14
        Line 46, change "record" to --recorded--;
        Line 47, change "record" to --recorded--; and
        Line 55, change "same" to --the same--.

COLUMN 15
        Line 46, delete "to".

UNITED STATES PATENT AND TRADEMARK OFFICE
CERTIFICATE OF CORRECTION

PATENT NO. : 6,020,976

DATED : February 1, 2000

INVENTOR(S) : Miyuki Fujita, et al.

It is certified that error appears in the above-identified patent and that said Letters Patent is hereby corrected as shown below:

<u>COLUMN 17</u>
        Line 12, change "discharges" to --discharge--;
        Line 53, delete "it"; and
        Line 60, change "Plurality" to --plurality--.

<u>COLUMN 18</u>
        Line 23, delete "it".

Signed and Sealed this

Twentieth Day of February, 2001

*Attest:*

NICHOLAS P. GODICI

*Attesting Officer*     *Acting Director of the United States Patent and Trademark Office*